United States Patent
Grover et al.

(10) Patent No.: US 10,831,841 B2
(45) Date of Patent: Nov. 10, 2020

(54) DETERMINING SIMILARITIES AMONG JOB TITLES TO ENHANCE JOB SEARCHING

(71) Applicant: Microsoft Technology Licensing, LLC, Redmond, WA (US)

(72) Inventors: Aman Grover, Sunnyvale, CA (US); Dhruv Arya, Sunnyvale, CA (US); Ganesh Venkataraman, San Jose, CA (US); Kimberly McManus, San Francisco, CA (US); Liang Zhang, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 15/379,641

(22) Filed: Dec. 15, 2016

(65) Prior Publication Data
US 2018/0173802 A1   Jun. 21, 2018

(51) Int. Cl.
| | | |
|---|---|---|
| *G06F 16/95* | (2019.01) | |
| *G06F 16/9535* | (2019.01) | |
| *G06N 20/00* | (2019.01) | |
| *G06F 16/248* | (2019.01) | |
| *G06F 16/2457* | (2019.01) | |
| *G06Q 10/10* | (2012.01) | |

(Continued)

(52) U.S. Cl.
CPC ........ *G06F 16/9535* (2019.01); *G06F 16/248* (2019.01); *G06F 16/2457* (2019.01); *G06N 20/00* (2019.01); *G06Q 10/1053* (2013.01); *G06Q 50/01* (2013.01); *H04L 67/306* (2013.01)

(58) Field of Classification Search
CPC .............. G06F 16/9535; G06F 16/248; G06F 16/2457; G06N 20/00; G06Q 10/1053; G06Q 50/01; H04L 67/306
See application file for complete search history.

(56) References Cited

U.S. PATENT DOCUMENTS

| | | | |
|---|---|---|---|
| 10,387,840 B2 * | 8/2019 | Zhao ................. | G06Q 10/1053 |
| 2004/0249774 A1 | 12/2004 | Caid et al. | |

(Continued)

OTHER PUBLICATIONS

"International Application Serial No. PCT/US2017/054092, International Search Report dated Dec. 1, 2017", 2 pgs.

(Continued)

*Primary Examiner* — Alicia M Willoughby
(74) *Attorney, Agent, or Firm* — Schwegman Lundberg & Woessner, P.A.

(57) ABSTRACT

Methods, systems, and computer programs are presented for expanding a job search that includes an industry by adding other similar industries. A method identifies job titles of members in a social network and performs, utilizing a machine-learning program, semantic analysis of the job titles to identify similarity coefficients among the job titles. The machine-learning program utilizes social network data to identify the similarity coefficients. Further, the method includes an operation for receiving a job search query, from a first member, including a query job title, and for expanding the job search query with job titles that are similar to the query job title. The method further includes operations for executing the expanded job search query to generate a plurality of job results, and for causing presentation on a display of one or more of the top job results.

15 Claims, 17 Drawing Sheets

(51) Int. Cl.
*G06Q 50/00* (2012.01)
*H04L 29/08* (2006.01)

(56) References Cited

U.S. PATENT DOCUMENTS

| | | | |
|---|---|---|---|
| 2007/0288308 A1* | 12/2007 | Chen | G06Q 30/0254 705/14.52 |
| 2012/0023121 A1 | 1/2012 | Foulger et al. | |
| 2013/0268373 A1* | 10/2013 | Grishaver | G06Q 30/02 705/14.67 |
| 2014/0122355 A1 | 5/2014 | Hardtke et al. | |
| 2014/0245189 A1* | 8/2014 | Berger | H04L 67/306 715/753 |
| 2015/0120714 A1* | 4/2015 | Xu | G06O 50/01 707/723 |
| 2015/0371277 A1* | 12/2015 | Filiz | G06Q 30/0269 705/14.66 |
| 2016/0063121 A1 | 3/2016 | Agarwal et al. | |
| 2016/0092638 A1 | 3/2016 | Padmani et al. | |
| 2016/0132834 A1* | 5/2016 | Pattabiraman | G06Q 10/1053 705/321 |
| 2016/0283905 A1* | 9/2016 | Lahti | G06F 17/30867 |
| 2017/0147984 A1* | 5/2017 | Zoia | G06F 17/30867 |
| 2017/0286865 A1* | 10/2017 | Fang | G06F 16/248 |
| 2017/0323397 A1* | 11/2017 | Menghani | G06F 17/30702 |

OTHER PUBLICATIONS

"International Application Serial No. PCT/US2017/054092, Written Opinion dated Dec. 1, 2017", 6 pgs.

"U.S. Appl. No. 15/379,656, Non Final Office Action dated Apr. 1, 2019", 16 pgs.

"International Application Serial No. PCT/US2017/054092, International Preliminary Report on Patentability dated Jun. 27, 2019", 8 pgs.

* cited by examiner

DETERMINING SIMILARITIES AMONG JOB TITLES TO ENHANCE JOB SEARCHING

TECHNICAL FIELD

The subject matter disclosed herein generally relates to methods, systems, and programs for finding quality job offerings for a member of a social network.

BACKGROUND

Some social networks provide job postings to their members. The member may perform a job search by entering a job search query, or the social network may suggest jobs that may be of interest to the user. However, current job search methods may miss valuable opportunities for a member because the job search engine limits the search to specific parameters. For example, the job search engine may look for matches to the member title in the profile, but there may be quality jobs that are associated with a different title that would be of interest to the member.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
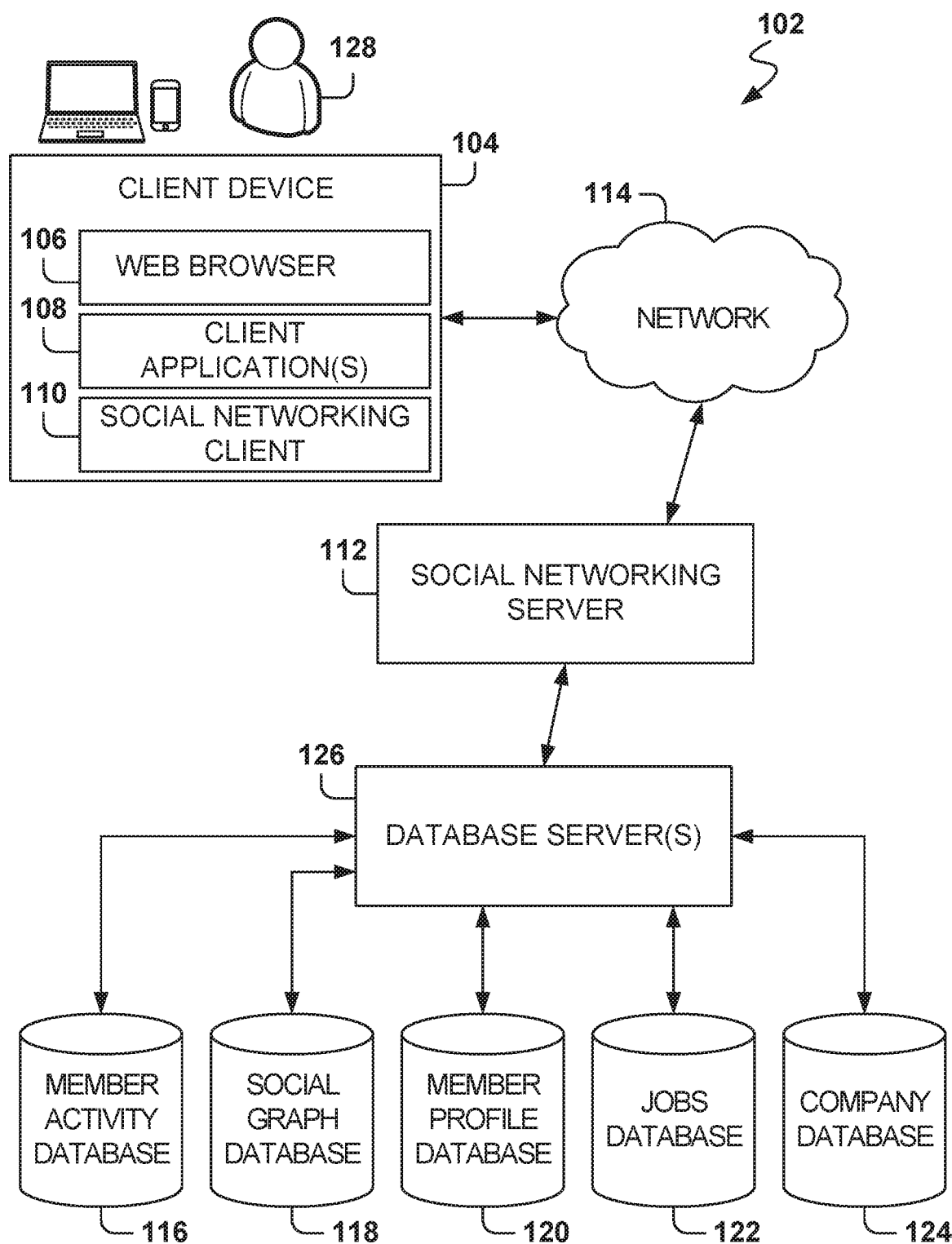
FIG. 1 is a block diagram illustrating a networked system, according to some example embodiments, including a social networking server.

Example methods, systems, and computer programs are directed to expanding a job search by adding titles that are similar to a job title entered in the job search. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Embodiments presented herein leverage deep learning techniques (e.g., Word2vec tool) to enhance the performance of job searches and job recommendations. For example, some approaches to job searches fail to match the member with the job if the member and the job have different titles, although the job title is tightly related to the member's title. For example, a vector representation of "software engineer" using a "bag-of-words representation" is completely different from the vector for "application developer," although the expressions are semantically similar. By capturing the semantic meaning of text used in the member profile and the job profile, the job search functionality is greatly improved.

In one aspect, similarities among job titles are obtained, and when a job search is performed, the job title similarities are used to uncover jobs that are associated with job titles that are similar to the job title in the job search.

A method identifies job titles of members in a social network and performs, utilizing a machine-learning program, semantic analysis of the job titles to identify similarity coefficients among the job titles. The machine-learning program utilizes social network data to identify the similarity coefficients. Further, the method includes an operation for receiving a job search query, from a first member, that includes a query job title, and for expanding the job search query with job titles that are similar to the query job title. The method further includes operations for executing the expanded job search query to generate a plurality of job results, and for causing presentation on a display of one or more of the top job results.

A method includes an operation for accessing, by a social networking server having one or more processors, a plurality of job applications, with each job application being submitted by a member for a job in a company, and the member having a member industry from a plurality of industries and the job having a job industry from the plurality of industries. The method also includes operations for performing semantic analysis of the job applications by a machine-learning program to identify similarity coefficients among the plurality of industries, and for receiving a job search query from a first member, with the job search query including a query industry from the plurality of industries. The job search query is expanded with industries that are similar to the query industry, and the social networking server executes the expanded job search query to generate a plurality of job results. The method further includes an operation for causing presentation on a display of one or more of top job results.

One general aspect includes a social networking server including a memory with instructions, a member database storing member information that includes a member industry from a plurality of industries, a jobs database storing a plurality of job applications, and one or more computer processors. Each job application is submitted by a member for a job in a company, with the job having a job industry from the plurality of industries. The instructions, when executed by the one or more computer processors, cause the one or more computer processors to perform operations including accessing the plurality of job applications; performing semantic analysis of the job applications by a machine-learning program to identify similarity coefficients among the plurality of industries; receiving a job search query from a first member, with the job search query including a query industry from the plurality of industries; expanding the job search query with industries that are similar to the query industry; executing the expanded job search query to generate a plurality of job results, and causing presentation on a display of one or more top job results.

One general aspect includes a non-transitory machine-readable storage medium including instructions that, when executed by a machine, cause the machine to perform operations including accessing, by a social networking server having one or more processors, a plurality of job applications, with each job application being submitted by a member for a job in a company, and the member having a member industry from a plurality of industries and the job having a job industry from the plurality of industries. Further, the storage medium also includes performing, by the social networking server, semantic analysis of the job applications by a machine-learning program to identify similarity coefficients among the plurality of industries, and receiving, by the social networking server, a job search query from a first member, with the job search query including a query industry from the plurality of industries. In addition, the storage medium also includes expanding, by the social networking server, the job search query with industries that are similar to the query industry, executing, by the social networking server, the expanded job search query to generate a plurality of job results, and causing presentation on a display of one or more top job results.

FIG. 1 is a block diagram illustrating a networked system, according to some example embodiments, including a social networking server 112, illustrating an example embodiment of a high-level client-server-based network architecture 102. The social networking server 112 provides server-side functionality via a network 114 (e.g., the Internet or a wide area network (WAN)) to one or more client devices 104. FIG. 1 illustrates, for example, a web browser 106 (e.g., the Internet Explorer® browser developed by Microsoft® Corporation), client application(s) 108, and a social networking client 110 executing on a client device 104. The social networking server 112 is further communicatively coupled with one or more database servers 126 that provide access to one or more databases 116-124.

The client device 104 may comprise, but is not limited to, a mobile phone, a desktop computer, a laptop, a portable digital assistant (PDA), a smart phone, a tablet, an ultra book, a netbook, a multi-processor system, a microprocessor-based or programmable consumer electronic system, or any other communication device that a user 128 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth.

In one embodiment, the social networking server 112 is a network-based appliance that responds to initialization requests or search queries from the client device 104. One or more users 128 may be a person, a machine, or other means of interacting with the client device 104. In various embodiments, the user 128 is not part of the network architecture 102, but may interact with the network architecture 102 via the client device 104 or another means. For example, one or more portions of the network 114 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, the web browser 106, the social networking client 110, and other client applications 108, such as a messaging application, an electronic mail (email) application, a news application, and the like. In some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access a member profile, to authenticate a user 128, to identify or locate other connected members, etc.). Conversely, if the social networking client 110 is not included in the client device 104, the client device 104 may use the web browser 106 to access the social networking server 112.

Further, while the client-server-based network architecture 102 is described with reference to a client-server architecture, the present subject matter is of course not limited to such an architecture, and could equally well find application in a distributed, or peer-to-peer, architecture system, for example.

In addition to the client device 104, the social networking server 112 communicates with the one or more database server(s) 126 and database(s) 116-124. In one example embodiment, the social networking server 112 is communicatively coupled to a member activity database 116, a social graph database 118, a member profile database 120, a jobs database 122, and a company database 124. The databases 116-124 may be implemented as one or more types of databases including, but not limited to, a hierarchical database, a relational database, an object-oriented database, one or more flat files, or combinations thereof.

The member profile database 120 stores member profile information about members who have registered with the social networking server 112. With regard to the member profile database 120, the member may include an individual person or an organization, such as a company, a corporation, a nonprofit organization, an educational institution, or other such organizations.

Consistent with some example embodiments, when a user initially registers to become a member of the social networking service provided by the social networking server 112, the user is prompted to provide some personal information, such as name, age (e.g., birth date), gender, interests, contact information, home town, address, spouse's and/or family members' names, educational background (e.g., schools, majors, matriculation and/or graduation dates, etc.), employment history, professional industry (also referred to herein simply as industry), skills, professional organizations, and so on. This information is stored, for example, in the member profile database 120. Similarly, when a representative of an organization initially registers the organization with the social networking service provided by the social networking server 112, the representative may be prompted to provide certain information about the organization, such as the company industry. This information may be stored, for example, in the member profile database 120. In some embodiments, the profile data may be processed (e.g., in the background or offline) to generate various derived profile data. For example, if a member has provided information about various job titles that the member has held with the same company or different companies, and for how long, this information may be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

In some example embodiments, a company database 124 stores information regarding companies in the member's profile. A company may also be a member, but some companies may not be members of the social network although some of the employees of the company may be members of the social network. The company database 124 includes company information, such as name, industry, contact information, website, address, location, geographic scope, and the like.

As users interact with the social networking service provided by the social networking server 112, the social networking server 112 is configured to monitor these interactions. Examples of interactions include, but are not limited to, commenting on posts entered by other members, viewing member profiles, editing or viewing a member's own profile, sharing content outside of the social networking service (e.g., an article provided by an entity other than the social networking server 112), updating a current status, posting content for other members to view and comment on, job suggestions for the members, job-post searches, and other such interactions. In one embodiment, records of these interactions are stored in the member activity database 116, which associates interactions made by a member with his or her member profile stored in the member profile database 120. In one example embodiment, the member activity database 116 includes the posts created by the users of the social networking service for presentation on user feeds.

The jobs database 122 includes job postings offered by companies in the company database 124. Each job posting includes job-related information such as any combination of employer, job title, job description, requirements for the job, salary and benefits, geographic location, one or more job skills required, day the job was posted, relocation benefits, and the like.

In one embodiment, the social networking server 112 communicates with the various databases 116-124 through the one or more database server(s) 126. In this regard, the database server(s) 126 provide one or more interfaces and/or services for providing content to, modifying content in, removing content from, or otherwise interacting with the databases 116-124. For example, and without limitation, such interfaces and/or services may include one or more Application Programming Interfaces (APIs), one or more services provided via a Service-Oriented Architecture (SOA), one or more services provided via a REST-Oriented Architecture (ROA), or combinations thereof. In an alternative embodiment, the social networking server 112 communicates with the databases 116-124 and includes a database client, engine, and/or module, for providing data to, modifying data stored within, and/or retrieving data from the one or more databases 116-124.

While the database server(s) 126 is illustrated as a single block, one of ordinary skill in the art will recognize that the database server(s) 126 may include one or more such servers. For example, the database server(s) 126 may include, but are not limited to, a Microsoft® Exchange Server, a Microsoft® Sharepoint® Server, a Lightweight Directory Access Protocol (LDAP) server, a MySQL database server, or any other server configured to provide access to one or more of the databases 116-124, or combinations thereof. Accordingly, and in one embodiment, the database server(s) 126 implemented by the social networking service are further configured to communicate with the social networking server 112.

Figure 2:
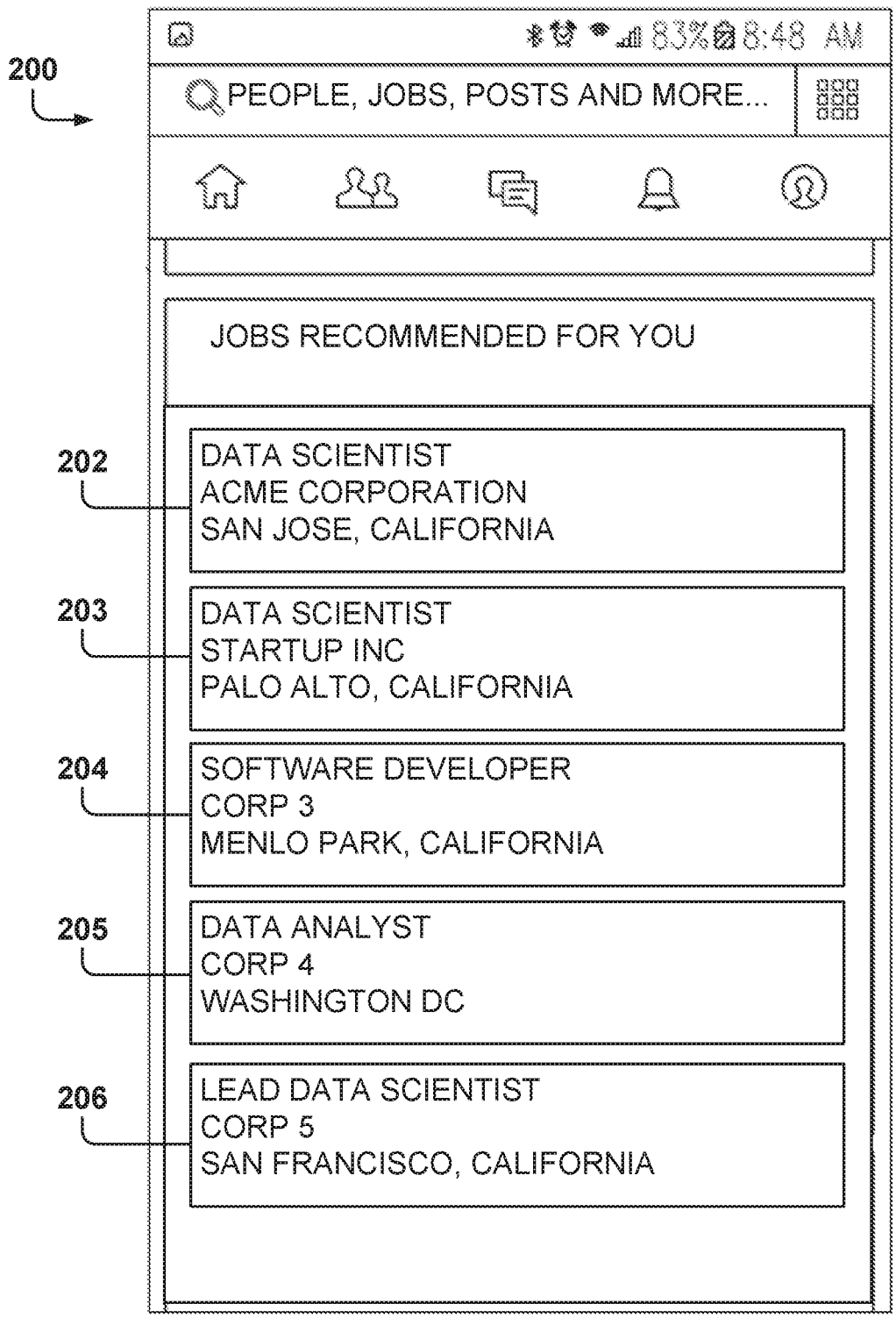
FIG. 2 is a screenshot of a user interface that includes job recommendations, according to some example embodiments.

FIG. 2 is a screenshot of a user interface 200 that includes job recommendations 202-206, according to some example embodiments. In one example embodiment, the social network user interface provides job recommendations, which are job posts that match the job interests of the user and that are presented with a specific job search request from the user.

In another example embodiment, a job search interface is provided for entering job searches, and the resulting job matches are presented to the user in the user interface 200.

As the user scrolls down the user interface 200, more job recommendations are presented to the user. In some example embodiments, the job recommendations are prioritized to present jobs in an estimated order of interest to the user.

Figure 3:
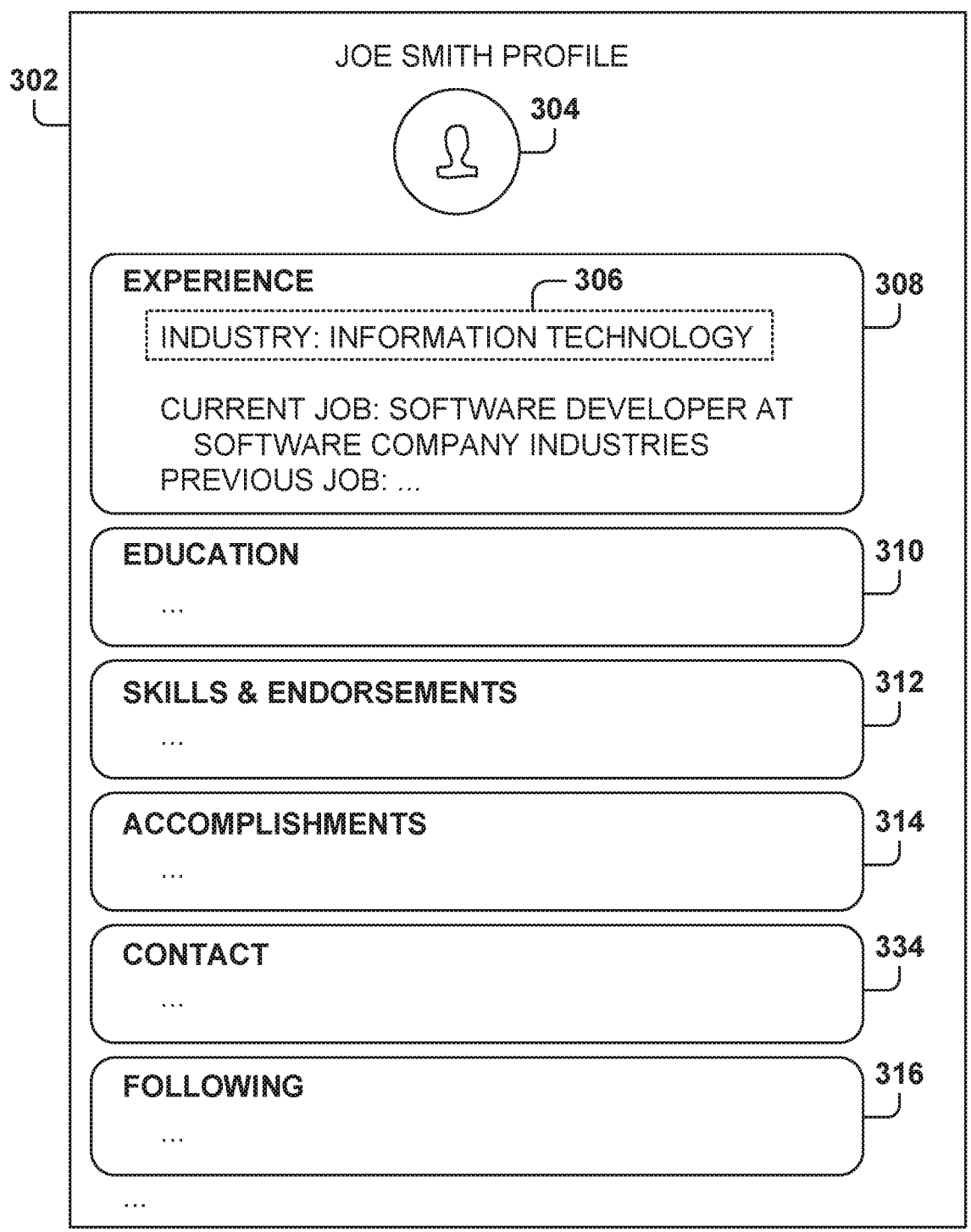
FIG. 3 is a screenshot of a user's profile view, according to some example embodiments.

FIG. 3 is a screenshot of a user's profile view, according to some example embodiments. Each user in the social network has a member profile 302, which includes information about the user. The user profile is configurable by the user and also includes information based on the user activity in the social network (e.g., likes, posts read).

In one example embodiment, the member profile 302 may include information in several categories, such as experience 308, education 310, skills and endorsements 312, accomplishment 314, contact information 334, following 316, and the like. Skills include professional competences that the member has, and the skills may be added by the member or by other members of the social network. Example skills include C++, Java, Object Programming, Data Mining, Machine Learning, Data Scientist, and the like. Other members of the social network may endorse one or more of the skills and, in some example embodiments, the account is associated with the number of endorsements received for each skill from other members.

The experience 308 information includes information related to the professional experience of the user. In one example embodiment, the experience 308 information includes an industry 306, which identifies the industry in which the user works. In one example embodiment, the user is given an option to select an industry from a plurality of industries when entering this value in the profile. In other example embodiments, the user may also enter an industry that is not in the list of predefined industries. In some example embodiments, the industry is defined at a high level. Some examples of industries configurable in the user profile include information technology, mechanical engineering, marketing, and the like. The user's profile is identified as associated with a particular industry, and the posts related to that particular industry are considered for inclusion in the user's feed, even if the posts do not originate from the user's connections or from other types of entities that the user explicitly follows. The experience 308 information area may also include information about the current job and previous jobs held by the user.

The education 310 includes information about the educational background of the user. The skills and endorsements 312 includes information about professional skills that the user has identified as having been acquired by the user, and endorsements entered by other users of the social network supporting the skills of the user. The accomplishments 314 area includes accomplishments entered by the user, and the contact information 334 includes contact information for the user, such as email and phone number. The following 316 area includes the name of entities in the social network being followed by the user.

In some implementations, to provide job recommendations, the job search engine looks for matches in the title or the skills of the member. The problem with this approach is that there may be jobs associated with different titles, although the different titles may be similar to the member's title. For example, the title "software engineer" is different from the title "application developer," but both titles are closely related because a majority of software engineers are also application developers, and vice versa. This title similarity is not captured by the job search so many results may be missed that could be of interest to the user. Embodiments presented herein use similarity analysis to identify titles that are closely related in order to improve job searches and job recommendations.

Figure 4:
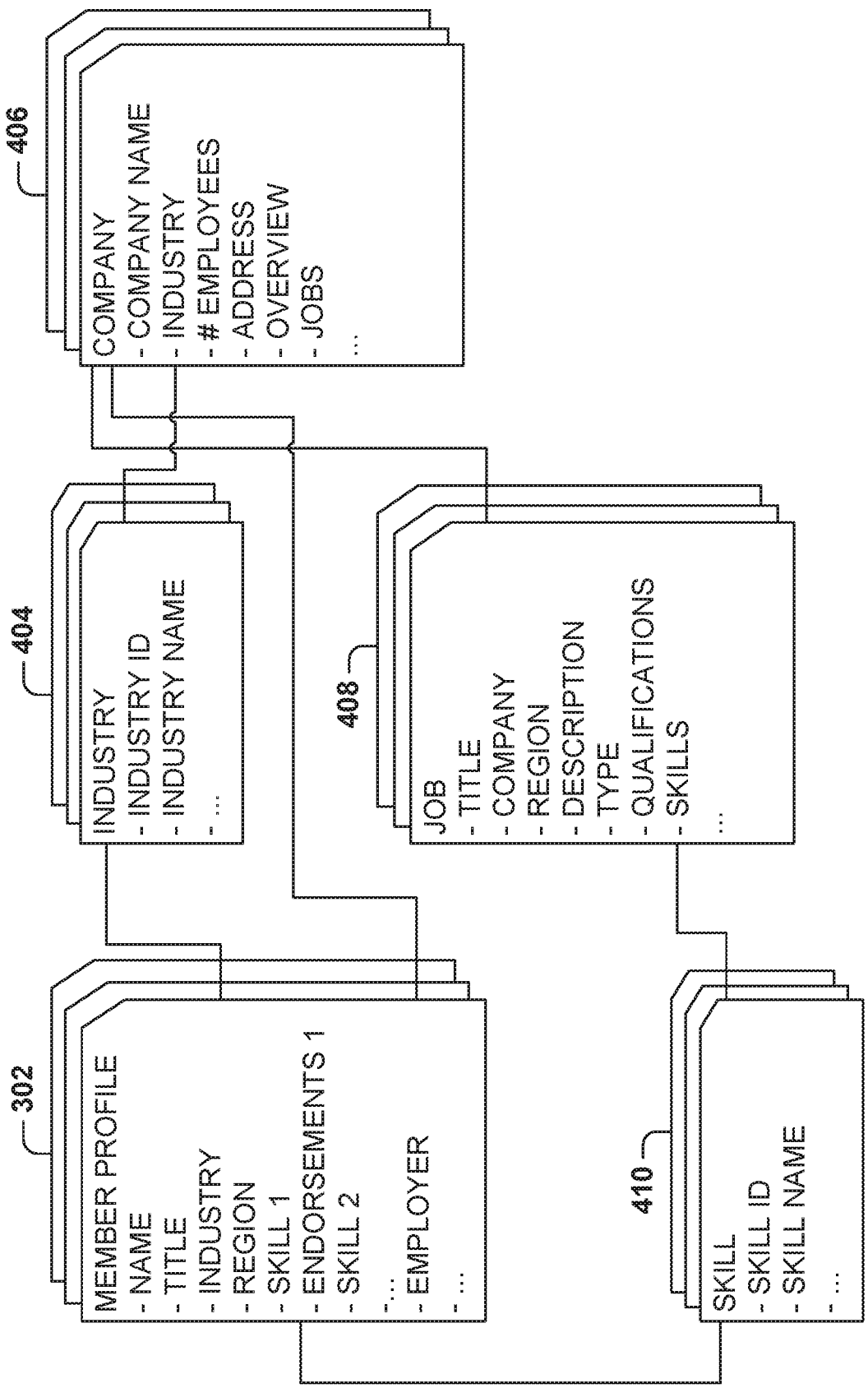
FIG. 4 illustrates data structures for storing job and member information, according to some example embodiments.

FIG. 4 illustrates data structures for storing job and member information, according to some example embodiments. The member profile 302, as discussed above, includes member information, such as name, title (e.g., job title), industry (e.g., legal services), geographic region, employer, skills and endorsements, and so forth. In some example embodiments, the member profile also includes job related data, such as jobs previously applied to, or jobs already suggested to the member (and how many times the job has been suggested to the member). Within member profile 302, the skill information is linked to skill data 410, the employer information is linked to company data 406, and the industry information is linked to industry data 404.

The industry data 404 is a table for storing the industries identified in the social network. In one example embodiment, the industry data 404 includes an industry identifier (e.g., a numerical value or a text string), and an industry name, which is a text string associated with the industry (e.g., legal services).

In one example embodiment, the company data 406 includes company information, such as company name, industry associated with the company, number of employees, address, overview description of the company, job postings, and the like. In some example embodiments, the industry is linked to the industry data 404.

The skill data 410 is a table for storing the different skills identified in the social network. In one example embodiment, the skill data 410 includes a skill identifier (ID) (e.g., a numerical value or a text string) and a name for the skill. The skill identifier may be linked to the member profiles 302 and job data 408.

In one example embodiment, job data 408 includes data for jobs posted by companies in the social network. The job data 408 includes one or more of a title associated with the job (e.g., software developer), a company that posted the job, a geographic region for the job, a description of the job, a type of job, qualifications required for the job, and one or more skills. The job data 408 may be linked to the company data 406 and the skill data 410.

It is noted that the embodiments illustrated in FIG. 4 are examples and do not describe every possible embodiment. Other embodiments may utilize different data structures, fewer data structures, combine the information from two data structures into one, add additional or fewer links among the data structures, and the like. The embodiments illustrated in FIG. 4 should therefore not be interpreted to be exclusive or limiting, but rather illustrative.

Figure 5:
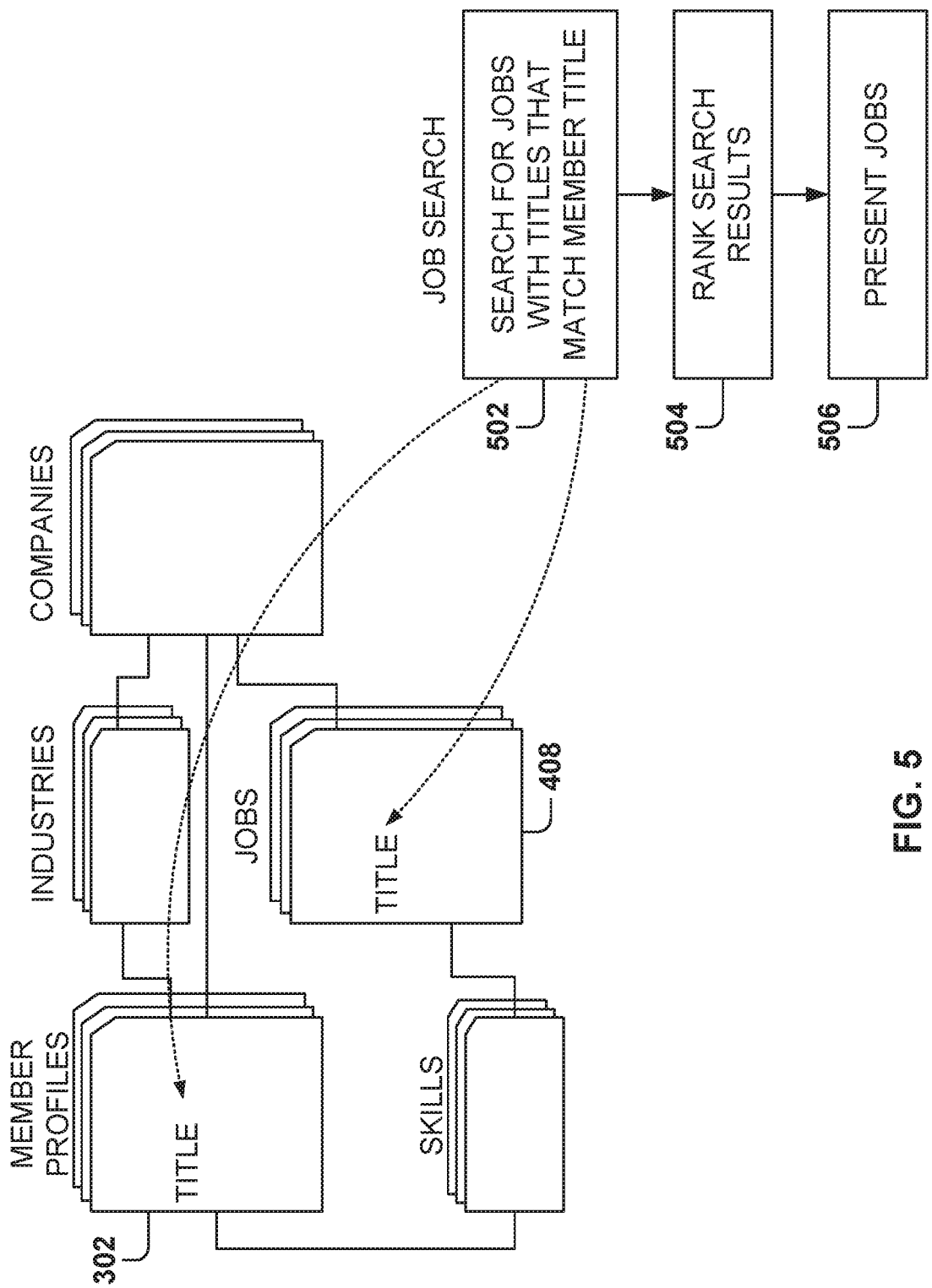
FIG. 5 illustrates a method for job searching based on matching member title and job title, according to some example embodiments.

FIG. 5 illustrates a method for job searching based on matching member and job titles, according to some example embodiments. In some example embodiments, job search and job recommendations utilize machine-learning algorithms to perform searches.

A basic job search function includes operations 502, 504, and 506. At operation 502, a search is performed for jobs with titles that match the member title. At operation 504, the results from the title matching are ranked according to criteria estimating the value of the job to the user. At operation 506, some of the jobs are presented to the member, such as in the user interface of FIG. 3. This basic job search will not find jobs that are associated with a title different from the member's title, although the job titles may be semantically similar to the member's title.

In other example embodiments, machine-learning algorithms are utilized to find title similarities in order to improve the job search. Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example inputs in order to make data-driven predictions or decisions expressed as outputs. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), and Support Vector Machines (SVM) tools may be used for classifying or scoring job posts.

In general, there are two types of problems in machine learning: classification problems and regression problems. Classification problems aim at classifying items into one of several categories (for example, is this object an apple or an orange?). Regression algorithms aim at quantifying some items (for example, by providing a value that is a real number). In some embodiments, example machine-learning algorithms provide a score (e.g., a number from 1 to 100) to qualify each job as a match for the user. In other example embodiments, machine learning is also utilized to provide a score (e.g., a number from 1 to 100) for finding similarities regarding titles, skills, or industries. The machine-learning algorithms utilize training data to find correlations among identified features, and how the feature values affect the outcome.

In one example embodiment, the features used for the embodiments presented herein may include any of the features identified in the data structures of FIG. 4, as well as similarity values obtained between these features, as described in more detail below.

Figure 6:
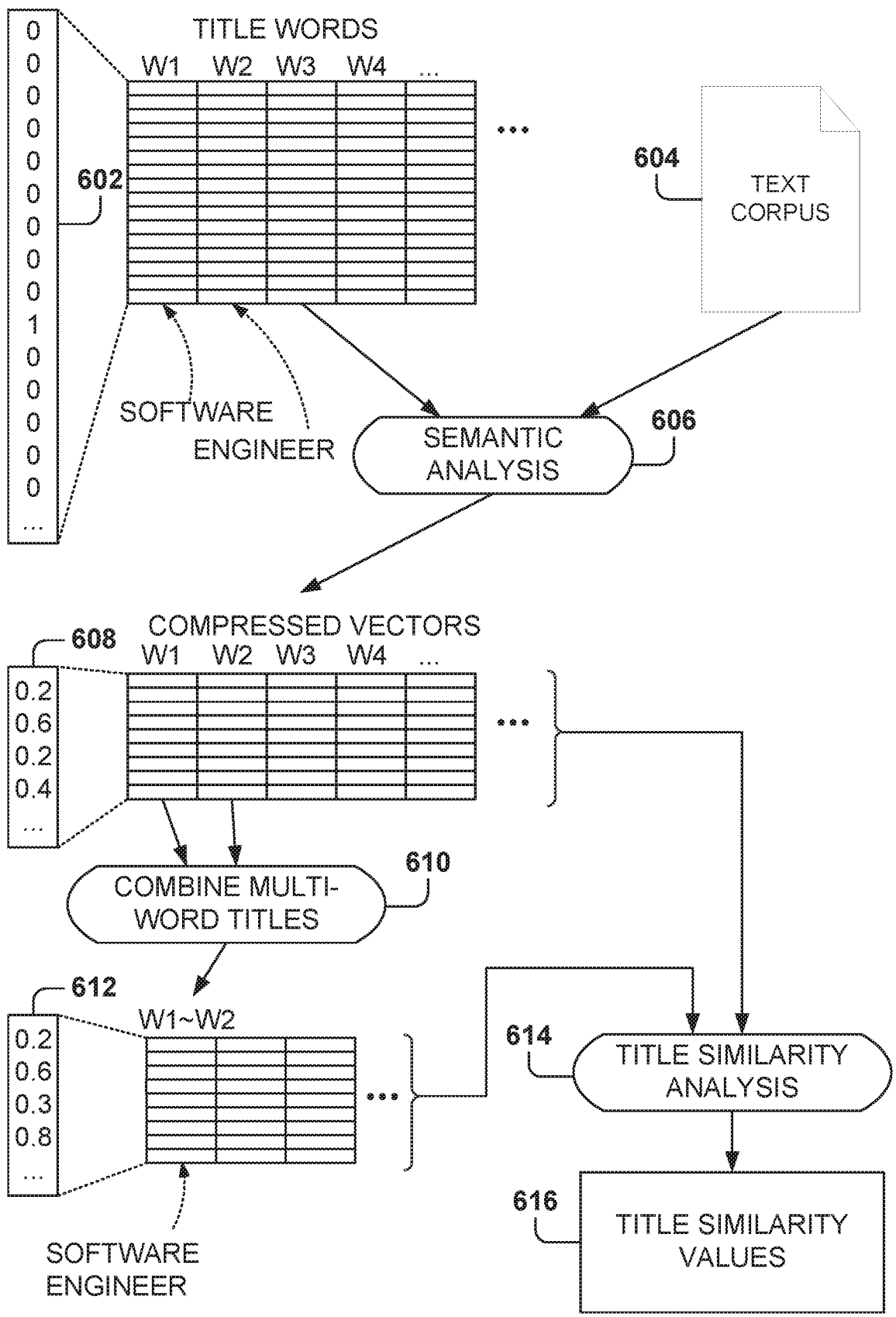
FIG. 6 illustrates a method for identifying similarities among titles based on semantic analysis, according to some example embodiments.

FIG. 6 illustrates a method for identifying similarities among titles based on semantic analysis, according to some example embodiments. In one example embodiment, each word from the title is represented as a vector the size of the vocabulary with a 1 corresponding to the word and the rest of the elements in the vector equal to 0. This representation is referred to as bag-of-words vector representation. For example, the word "software" has a vector 602 with a single 1 and the word "engineer" also has a single 1 in the vector, but in a different position.

In one example embodiment, the vectors are condensed into a fixed dimension vector (e.g., with a dimension of 200, but other sizes are also possible) and the elements of the condensed vector are real numbers, where more than one element may be nonzero. For example, for the word "software," there is a corresponding compressed vector 608 with a plurality of non-zero values.

The semantic analysis finds similarities among words by creating a vector 608 for each word such that words with similar meanings have vectors near each other. In one example embodiment, the tool Word2vec is used to perform the semantic analysis, but other tools may also be used, such as Gensim, Latent Dirichlet Allocation (LDA), or Tensor flow.

These models are shallow, two-layer neural networks that are trained to reconstruct linguistic contexts of words. Word2vec takes as input a large corpus of text and produces a high-dimensional space (typically between a hundred and several hundred dimensions). Each unique word in the corpus is assigned a corresponding vector 608 in the space. The vectors 608 are positioned in the vector space such that words that share common contexts in the corpus are located in close proximity to one another in the space. In one example embodiment, each element of the vector 608 is a real number.

For example, Word2vec may be utilized to identify the similarity between two words. In one example, a large number of titles were used as input, and a list was created of words having a similar meaning to the word "software." A text corpus 604 is used by the semantic analysis tool to identify similarities. In some example embodiments, the text corpus 604 includes member related data and company data, but other embodiments may utilize fewer data or additional data, such as user posts on the social network, industry data, skill data, and the like.

In another example embodiments, a semantic analysis 606 is performed utilizing job application data, by pairing member title to job title for each job application. More details about utilizing job application data are described below with reference to FIG. 7, which describes pairing job and member industry for job applications, but the same principles may be applied for pairing job and member titles.

In some example embodiments, the following parameters were used for performing the semantic analysis 606:

Minimum number of occurrences of a word to be considered in the vocabulary min_count (e.g., 5).
Maximum size of left window and right window from the target word window_size (e.g., 5).
Number of negative samples to be used negative_sample (e.g., 25).
Number of concurrent steps concurrent_steps (e.g., 12).
Subsample threshold for word occurrence subsample, where words that appear with higher frequency will be randomly down-sampled (e.g., $1e^{-3}$)
Number of epochs num_epochs (e.g., 15).

In some example embodiments, tokenization and stemming are performed on the titles (as well as industries, skills, etc.). Tokenization is the process of demarcating and possibly classifying sections of a string of input characters. Further, documents may include different forms of a word, such as "organize," "organizes," and "organizing." Additionally, there are families of derivationally related words with similar meanings, such as "democracy," "democratic," and "democratization." In one example embodiment, common stop words are removed. Stop words are the most common words in English, and the number of stop words may vary from a few dozens to several hundreds. Any group of words may be chosen as the stop words. Some of the most common stop words include "the," "is," "at," "which," and "on." Stemming usually refers to a heuristic process that chops off the ends of words aiming to achieve the goal of finding the common root for the words, often including the removal of derivational affixes. Lemmatization usually refers to classifying the words based on the morphological analysis of words, aiming to remove inflectional endings to return the base or dictionary form of a word, which is known as the lemma.

The goal of stemming and lemmatization is to reduce inflectional forms and sometimes derivationally related forms of a word to a common base form. For instance, "am," "are," and "is" may be represented by the word "be." "House," "houses," "house's," and "houses" may be represented by simply "house."

As used herein, the similarity coefficient between a first word and a second word is a real number that quantifies a similarity between the first word and the second word. In some example embodiments, the similarity coefficient range is [0-1], but other ranges are also possible. In some embodiments, cosine similarity is utilized to calculate the similarity coefficient between the word vectors.

Below are some of the similarity results for the words "software" and "doctor," where each similar word is followed by the similarity coefficient with reference to "software" and "doctor," respectively. The top 15 similar words are presented sorted by the similarity coefficient.

Top 15 similar words for "software":
software 1.0000
sofware 0.8110
sotware 0.7480
softwre 0.6879
frontend 0.6857
android 0.6615
softaware 0.6610
python 0.6582
softwar 0.6541
firmware 0.6282
php 0.6214
sofrware 0.6152
sotfware 0.6032
softwere 0.6016
fullstack 0.5967
softeware 0.5960
.net 0.5959
softare 0.5922
application 0.5881 alphapp1 0.5841
Top 15 similar words for "doctor":
doctor 1.0000
docter 0.6323
naturapathy 0.5915
fy1 0.5759
docotor 0.5530
fy2 0.5443
philosophiae 0.5412
naturopathic 0.5386
naturopathy 0.5365
introduktionslaege 0.5340
medicicne 0.5327
paediatrics 0.5321
nautropathic 0.5266
doctore 0.5247
paeditrics 0.5234
docotr 0.5226
obstetric&gynaecology 0.5207
gpst2 0.5207
homoeopathic 0.5191
physician 0.5172

It is noted that the list includes misspelled words, such as "sofware" and "docter." However, many titles have more than one word (e.g., "software engineer," "administrative assistant," etc.), and the compressed vectors 608 for the plurality of words of the title have to be combined at operation 610 to obtain combination vectors 612, which are compressed vectors resulting from combining the compressed vectors of two or more words. For example, the combination vector 612 for "software engineer" is obtained by combining the compressed vectors 608 of "software" and "engineer" (represented as W1~W2).

There are several merging techniques for combining vectors. In one example embodiment, the vectors are combined by calculating the average of the vectors, which includes calculating the averages for each of the elements within the vector.

In another example embodiment, the vectors are merged by calculating the sum of the compressed vectors 608. In yet other example embodiments, some of the words are not included for calculating the combination vectors 612 because some of the words may be noise for some of the titles. For example with a title such as "President of the Trade Association of American Plumbers," the words "of," "the," and "American" may be ignored to obtain the title combination vector 612.

In some example embodiments, weights are assigned to each of the word vectors before combining them, based on their expected contribution to the meaning of the title, and the combination vector is calculated by adding the weighted vectors for each of the words. It is noted that one of the weights may be 0, which is equivalent to not using the word vector for the combination vector. In one example embodiment, the weights are calculated utilizing term frequency-inverse document frequency (TF-IDF) scores.

TF-IDF is a numerical statistic intended to reflect how important a word is to a document in a collection or corpus. The TF-IDF increases in value proportionally to the number of times a word appears in the document, but is offset by the frequency of the word in the corpus, which helps to adjust for the fact that some words appear more frequently in general.

TF is the raw frequency of a term in a document, e.g., the number of times that a term occurs in a document. The IDF is a measure of how much information the word provides, that is, whether the term is common or rare across all documents. In some example embodiments, the IDF is calculated as the logarithm of the total number of documents divided by the number of documents containing the term. In other example embodiments, other equations may be utilized to calculate the IDF. The TF-IDF is then calculated as the TF times the IDF, but other combinations of TF and IDF may be used to calculate the TF-IDF.

"Software" is an important title word that obtains a TF of 2 and an IDF of 5, in one example. Thus, the TF-IDF is 10 (2×5). Another word such as "USA" is very common and the resulting TF-IDF is 0, or close to 0.

In some example embodiments, the combination vector is calculated by obtaining the weighted average of the compressed vectors 608, where the weights are the respective TF-IDFs of the words. This may be expressed according to the following equation:

$$\overline{CV} = (\Sigma w_i)^{-1} \cdot \Sigma w_i \overline{WV_i} \qquad (1)$$

Where $\overline{CV}$ is the combination vector 612, $w_i$ is the weight (e.g., TF-IDF) for word i, and $\overline{WV_i}$ is the compressed vector for word i. In another example embodiment, the combination vector 612 may be calculated simply as:

$$\overline{CV} = \Sigma w_i \overline{WV_i} \qquad (2)$$

In another example embodiment, the top n (e.g., 3) most important words (measured by their TF-IDF) are used to calculate the combination vector 612. However, some important context maybe lost with this approach as some of the discarded words may have an important semantic meaning.

Once the compressed vectors are available for single and multi-word titles, a title similarity analysis 614 is performed to obtain the similarity values 616. In one example embodiment, the following top-ten results were obtained for the title "business analyst," including the similarity coefficient:

0.9406, "senior business analyst";
0.8023, "senior analyst";
0.7802, "business consultant";
0.7775, "financial analyst";
0.7640, "research analyst";
0.7423, "business development";
0.7332, "business development manager";
0.7010, "business development executive";
0.6894, "director business development"; and
0.5868, "senior account manager".

In another example embodiment, the cosine similarity between "software engineer" and "application developer" was calculated with a similarity coefficient of 0.6377.

Figure 7:
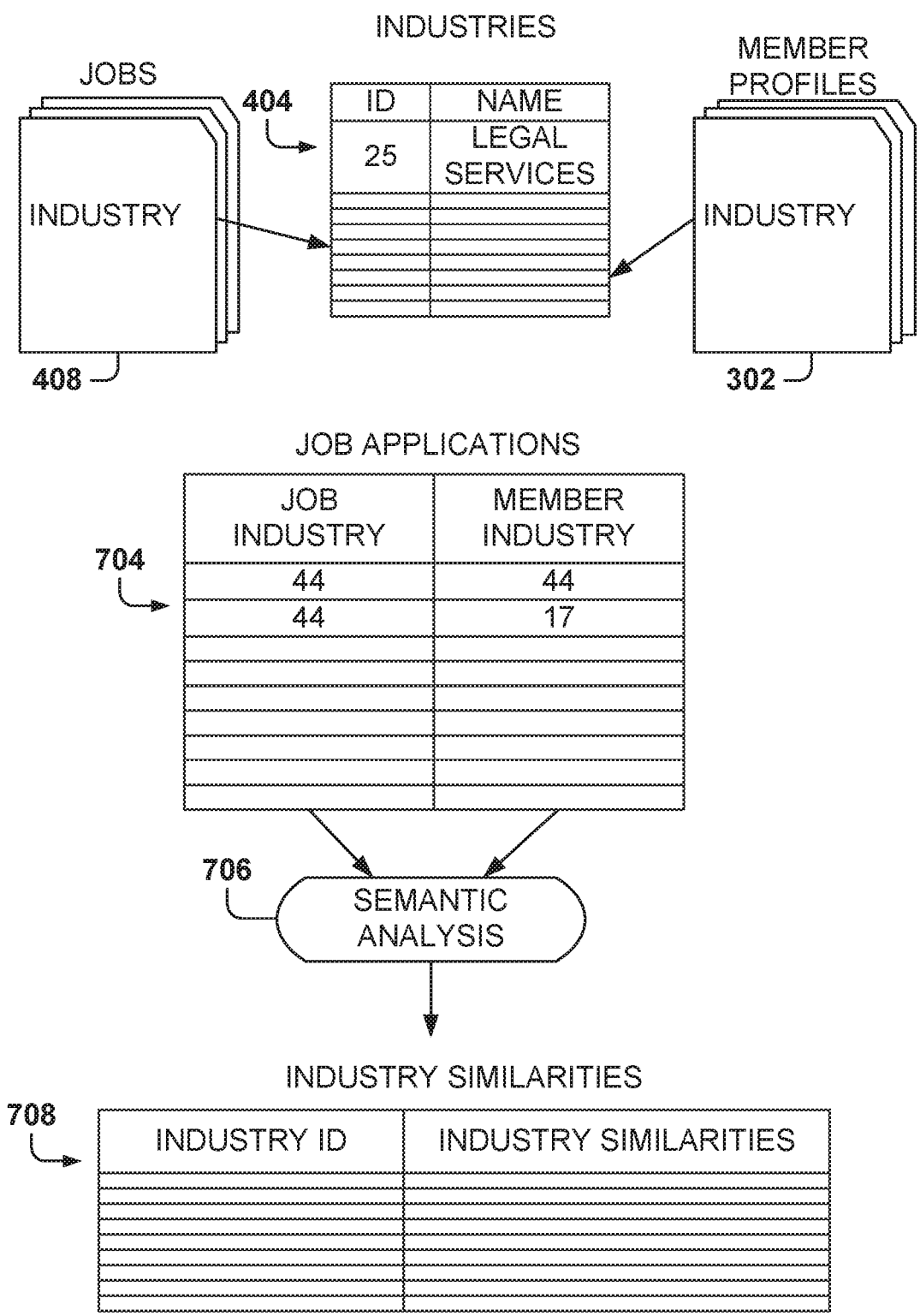
FIG. 7 illustrates a method for identifying similarities among job and member industries, according to some example embodiments.

FIG. 7 illustrates a method for identifying similarities among job and member industries, according to some example embodiments. As discussed above, each member has an industry in its profile, and each company is also associated with an industry. In some example embodiments, the member is associated with just one industry in the system, although the member could be associated with more than one industry (e.g., Internet and computer science). The goal is to identify other industries that the user could belong to, thereby allowing the job search to expand into related industries to find good job matches for the member in more than one industry.

In some example embodiments, to identify related industries for the user, job application data is analyzed. A member applying to a job associated with a different industry (the industry of the company that posted the job) is a good sign that jobs, having the same industry as the job that the member applied for, will be good candidates for presentation to the member, or to members in the same industry as the member.

For example, a company may be in the entertainment industry and the company employs many software developers to create entertainment-related programs and features. Therefore, a software developer may want to see jobs in this company, although the company is not in the software-development industry.

In one example embodiment, the industry data 404 includes an industry identifier having a numerical value (e.g., 25). Job data 408 and member profile 302 are linked to the industry data 404 via the industry identifier.

A job-application table 704 is configured, where each row is associated with a job application and the row includes the job industry and the member industry (e.g., 44 and 17). It is noted that sometimes the job and member industries will be the same while other job applications will have different job and member industries. In one example embodiment, the analysis is based on the industry identifiers, although other embodiments may perform the analysis on the industry names.

Semantic analysis 706 is performed to capture the similarity among the different industries using the job-application table 704. In one example embodiment, Word2vec is used to perform the semantic analysis 706, but other machine-learning tools may also be utilized. The analysis encodes industry identifiers into a multi-dimensional vector (of in dimensions). This enables performing vector operations on industries to find similarities (e.g., cosine similarity).

In one example embodiment, Word2vec was performed with the following parameters: (min_count, 5), (window_size, 1), (negative_sample, 25), (concurrent_steps, 12), (subsample, 1e$^{-3}$), (num_epochs, 15). However, other parameters values may also be used.

The result of the semantic analysis 706 includes industry similarities 708, where for each industry ID, a plurality of industries are identified with the respective similarity coefficients. The results obtained showed that similar industries had high similarity coefficients. For example, the top-five results (expressed as industry identifier, cosine similarity, and industry name) for "computer software," "legal services," and "medical practice" were as follows:

For "computer software" (ID 4):
  6, 0.6535, "internet";
  84, 0.6401, "information services";
  96, 0.6208, "information technology & services";
  118, 0.6168, "computer & network security"; and
  3, 0.5949, "computer hardware."
For "legal services" (ID 10):
  9, 0.6507, "law practice";
  43, 0.4956, "financial services";
  120, 0.4915, "alternative dispute resolution";
  73, 0.4612, "judiciary"; and
  147, 0.4241, "industrial automation."
For "medical practice" (ID 13):
  14, 0.6635, "hospital & health care";
  12, 0.5489, "biotechnology";
  139, 0.5098, "mental health care";
  124, 0.5028, "health, wellness & fitness"; and
  15, 0.5011, "pharmaceuticals."

Figure 8:
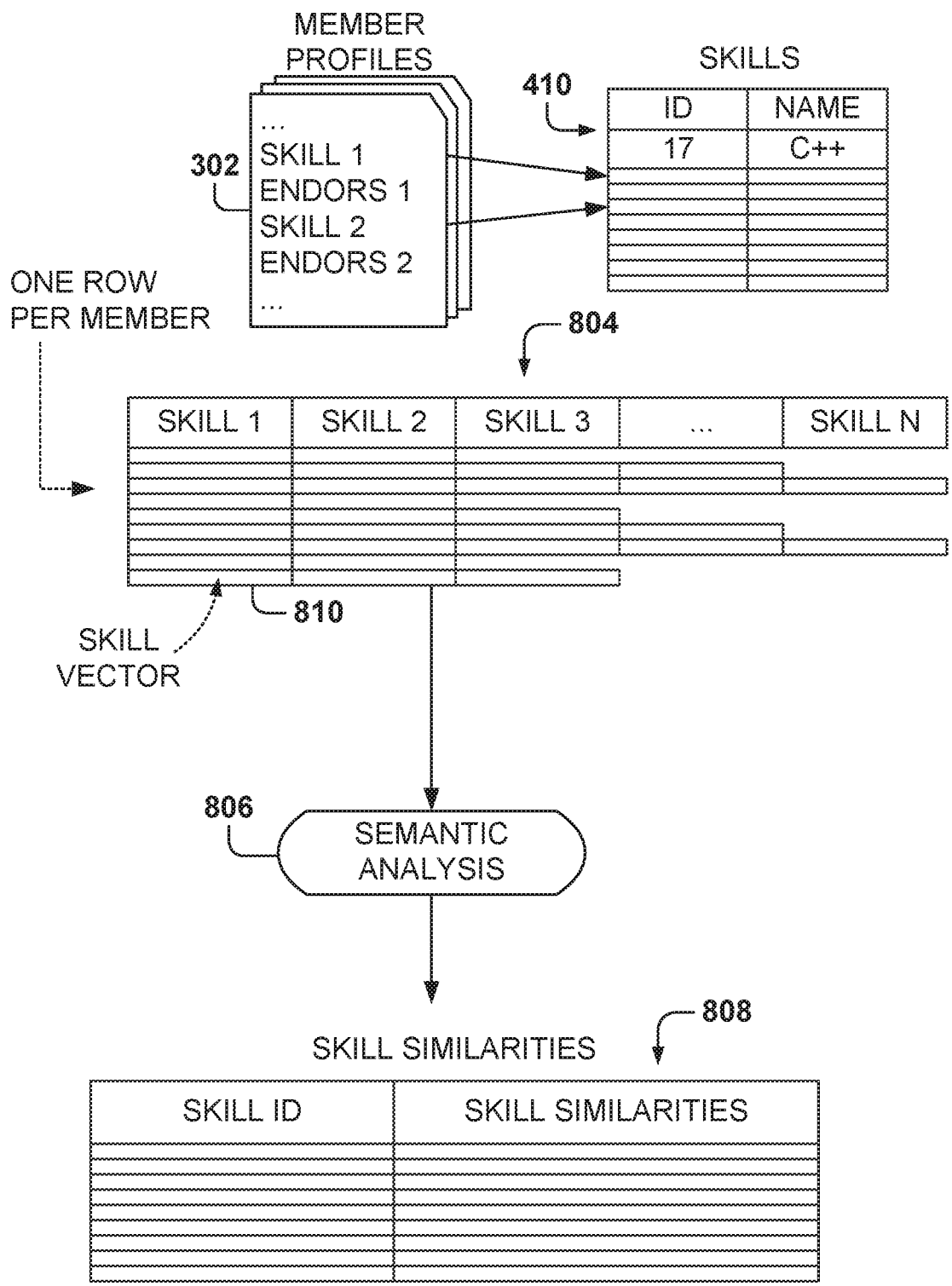
FIG. 8 illustrates a method for identifying similarities among member skills, according to some example embodiments.

FIG. 8 illustrates a method for identifying similarities among member skills, according to some example embodiments. In some example embodiments, the skills similarities are identified in order to improve job searching. In some job searches, a query expansion is performed if the skill is identified in the query. For example, if a search is entered for "software engineer C++" then "C++" is identified as a skill. Once "C++" is identified as a skill, the job search query may be expanded with similar skills.

Skills may also be extracted from job posts. For example, by analyzing the job title, description, or requirements, one or more skills may be identified for the job. The goal is to recommend jobs to members who have skills relevant to the job, including skills that are similar to the ones found from the job posting. If only the literal meaning is considered for the job skills, then important opportunities may be lost. For example, if the job search system is not aware of the similarity between "machine learning" and "data mining" skills, then a person may miss good jobs that are good matches for the member.

In some example embodiments, the skill data 410 includes a skill identifier (e.g., an integer value) and a skill description text (e.g., C++). The member profiles 302 are linked to the skill identifier, in some example embodiments.

Initially, a compressed skill vector 810 is created for each skill (for example, by following the same process described with reference to FIG. 6 for titles). Afterwards, a concatenated skill table 804 is created, where each row includes a sequence with all the skills for a corresponding member. Thus, the first row of concatenated skill table 804 includes all the compressed skill vectors for the skills of the first member, the second row includes all the compressed skill vectors for the skills of the second member, and so forth.

Semantic analysis 806 is then performed on the concatenated skill table 804. In one example embodiment, Word2vec is utilized with the following parameters: (min_count, 1), (window_size, 25, which was the 90th percentile size), (negative_sample, 25), (concurrent_steps, 12), (subsample, 0), (num_epochs, 15), and (embedding_size, 100). The result is skill similarities 808, where each skill is associated with corresponding similar skills).

In general, not all skills are of the same importance for a member. Therefore, in some example embodiments, the skills are weighted by multiplying each compressed skill vector 810 by a corresponding weight. In one example embodiment, the weight is the number of endorsements received by the member for that skill. In general, the more endorsements a member has for a skill, the more important the skill is for the member.

Some example results for "machine learning" (with the skill identifier in parenthesis) include the following:
  pattern recognition (5449), 0.9100;
  neural network (4892), 0.9053;
  artificial intelligence (2407), 0.8989;
  natural language processing (5835), 0.8836;
  algorithm (1070), 0.8834;
  algorithm design (6001), 0.8791;
  computer vision (4262), 0.8779;
  latex (6420), 0.8500;
  computer science (1541), 0.8441;
  deep learning (50518), 0.8411;
  data mining (2682), 0.8356;
  texting mining (7198), 0.8326;
  parallel computing (5626), 0.8308;
  recommender system (12226), 0.8306;
  artificial neural network (12469), 0.8252;
  data science (50061), 0.8213;
  genetic algorithm (7630), 0.8093;
  python (1346), 0.8037; and
  image processing (2741), 0.8019.

In other example embodiments, the same similarity analysis may be performed for company names, such that if a member enters the search query for a job in a specified company, the job results may also include job postings from similar companies.

Figure 9:
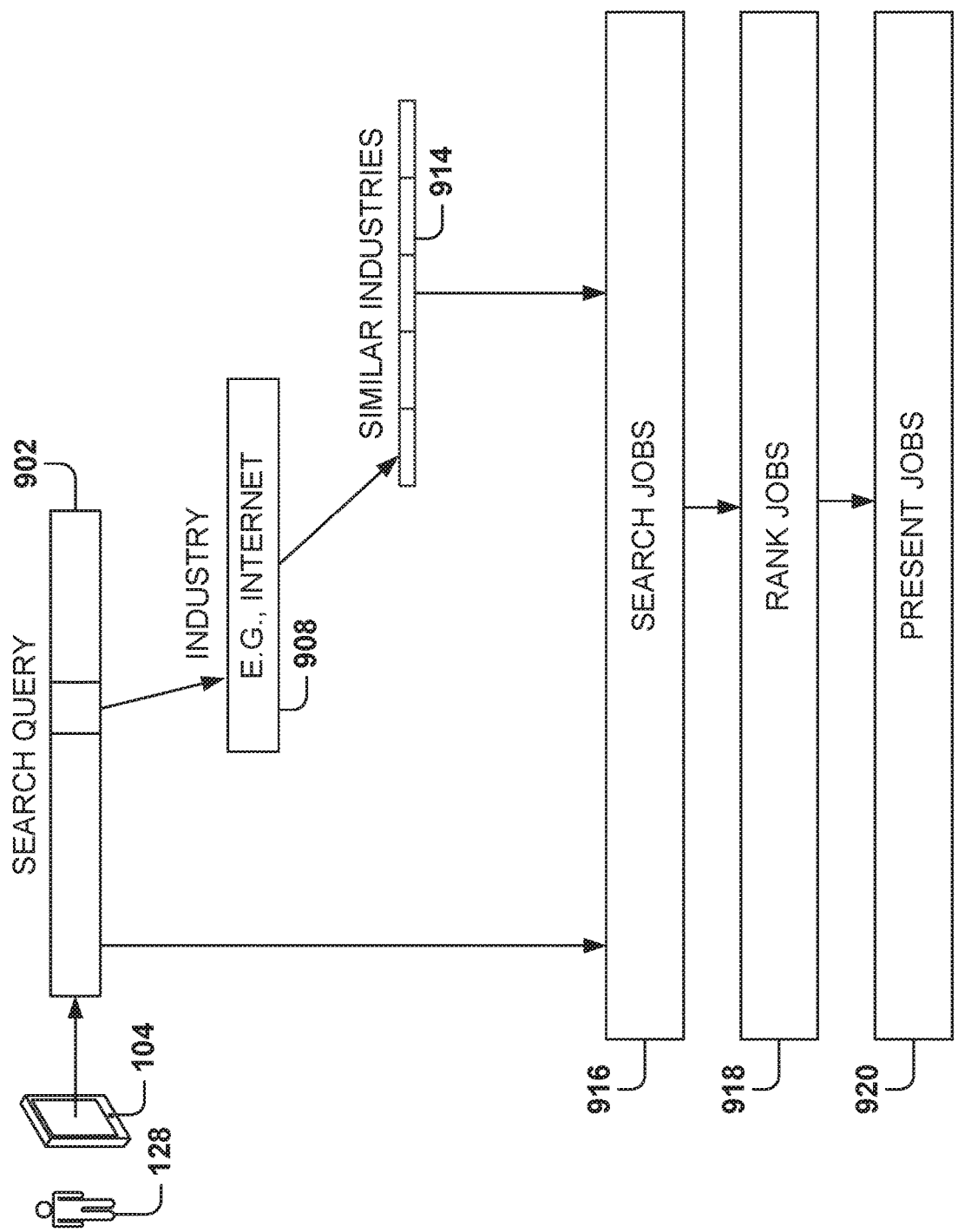
FIG. 9 illustrates a method for expanding a job search query with similar industries, according to some example embodiments.

FIG. 9 illustrates a method for expanding a job search query 902 with similar industries, according to some example embodiments. After the similarities have been identified for the different industries, the similarity coefficients may be used to improve and expand job searching.

A user 128 enters a search query 902 in the client device 104, and the search query 902 is transmitted to the social networking server. A tagger program analyzes the query and determines if the query 902 includes an embedded industry 908 (e.g., computer science), or other parameters, such as skill, title, company, and the like. For example, if a job search query 902 is "software engineer in Internet," the tagger identifies that "Internet" is the industry and "software engineer" is the title.

In some example embodiments, similar industries 914, similar to the industry 908 in the search query 902, are identified and utilized to expand the job search. For example, the top five similar industries to the industry 908 are identified for being utilized in the search, but other embodiments may utilize a different number of similar industries for query expansion. Further, in some example embodiments, the similar industries are weighted when doing the search, e.g., by using the similarity coefficient. Further yet, in some example embodiments, a threshold similarity coefficient is identified and the industries with a similarity coefficient about the threshold similarity coefficient are included in the job search.

In one example embodiment, two similar industries are added to the "Internet" industry: "computer software" and "online media." At operation 916, the job search engine utilizes the search query 902 and the similar industries 914 to perform a job search for the user 128. At operation 918, the job search engine ranks the candidate jobs for presentation to the user at operation 920.

In one example embodiment, ranking jobs includes boosting results where the industry of the job is equal to the industry of the search query 902, and boosting results where the industry of the job is equal to the industry of the user 128.

Figure 10:
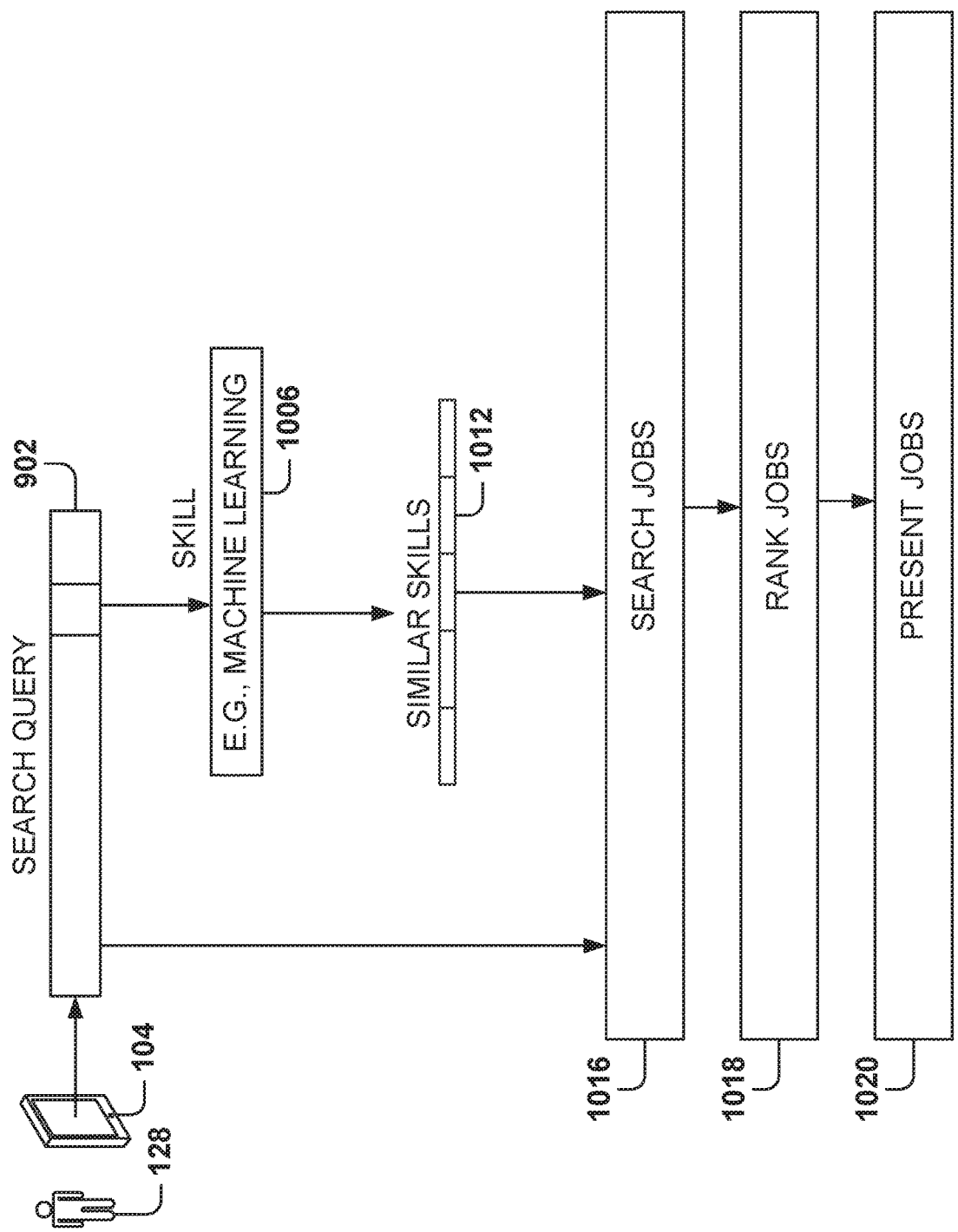
FIG. 10 illustrates a method for expanding a job search query with similar member skills, according to some example embodiments.

FIG. 10 illustrates a method for expanding a job search query with similar member skills, according to some example embodiments. The job search query 902 may also include a skill 1006, which is identified by the tagger in the search query 902. For example, if the skill "machine learning" is identified, similar skills 1012 are obtained and used for the job search 1016. In one example embodiment, for the skill "machine learning," the following similar skills are included for searching jobs 1016: "pattern recognition," "neural network," "artificial intelligence," "natural language processing," and "algorithm."

In some example embodiments, a predetermined number of similar skills are included in the search (e.g., a number in the range from 3 to 20 or more). In other example embodiments, a threshold similarity coefficient is identified and the skills with a similarity coefficient above the threshold are included in the job search 1016. After the jobs are searched, the jobs are ranked 1018 and presented 1020 to the user.

Figure 11:
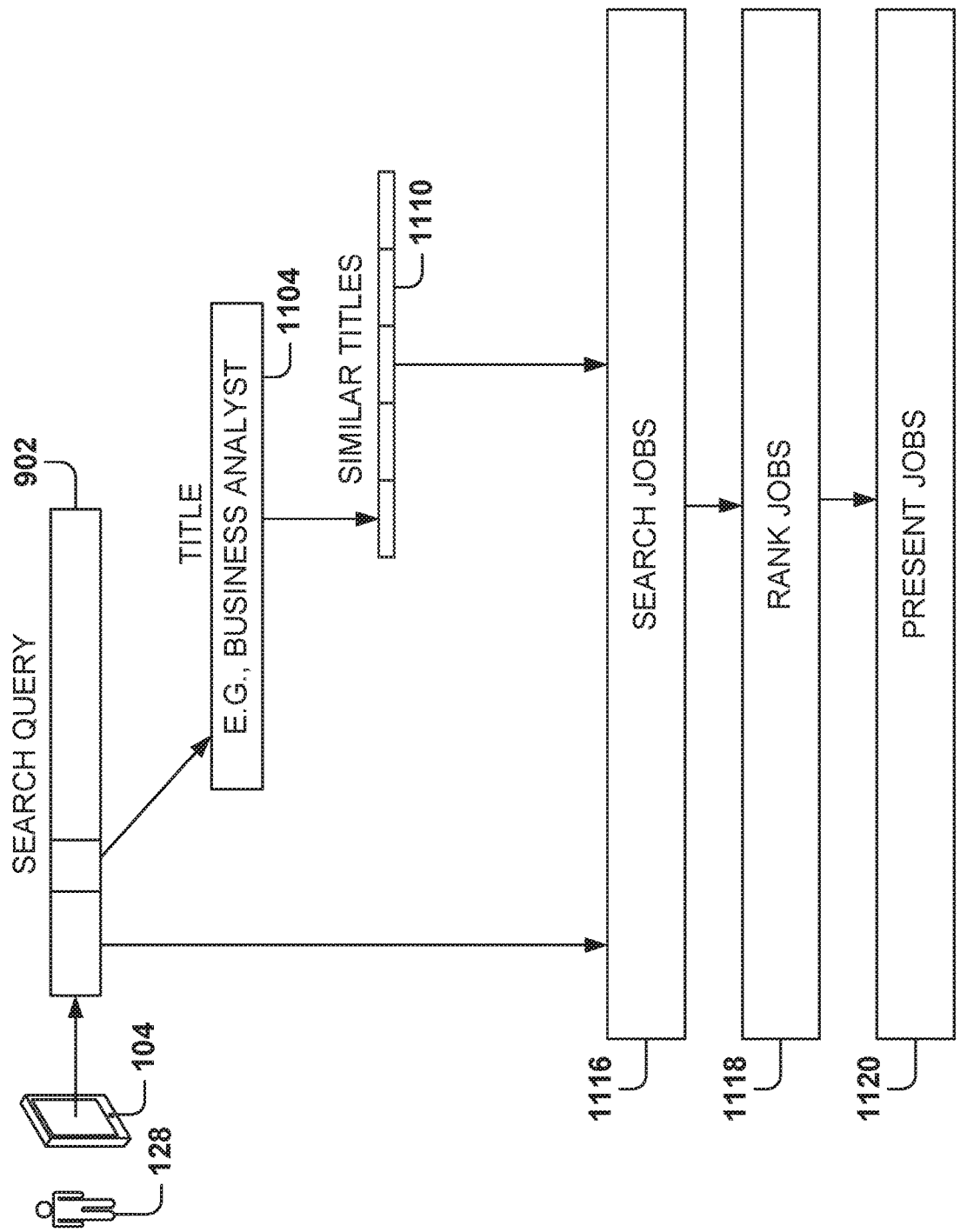
FIG. 11 illustrates a method for expanding a job search query with similar titles, according to some example embodiments.

FIG. 11 illustrates a method for expanding a job search query with similar titles, according to some example embodiments. The job search query 902 may also include a title 1104, which is identified by the tagger in the search query 902. For example, if the title "business analyst" is identified, similar titles 1110 are obtained and used for the search 1116. In one example embodiment, for the title "business analyst," the following similar titles are included for searching jobs 1116: "senior business analyst," "senior analyst," "business consultant," and "financial analyst."

In some example embodiments, a predetermined number of similar titles are included in the search (e.g., a number in the range from 3 to 20 or more). In other example embodiments, a threshold similarity coefficient is identified and the titles with a similarity coefficient above the threshold are included in the job search 1116. After the jobs are searched, the jobs are ranked 1118 and presented 1120 to the user.

Figure 12:
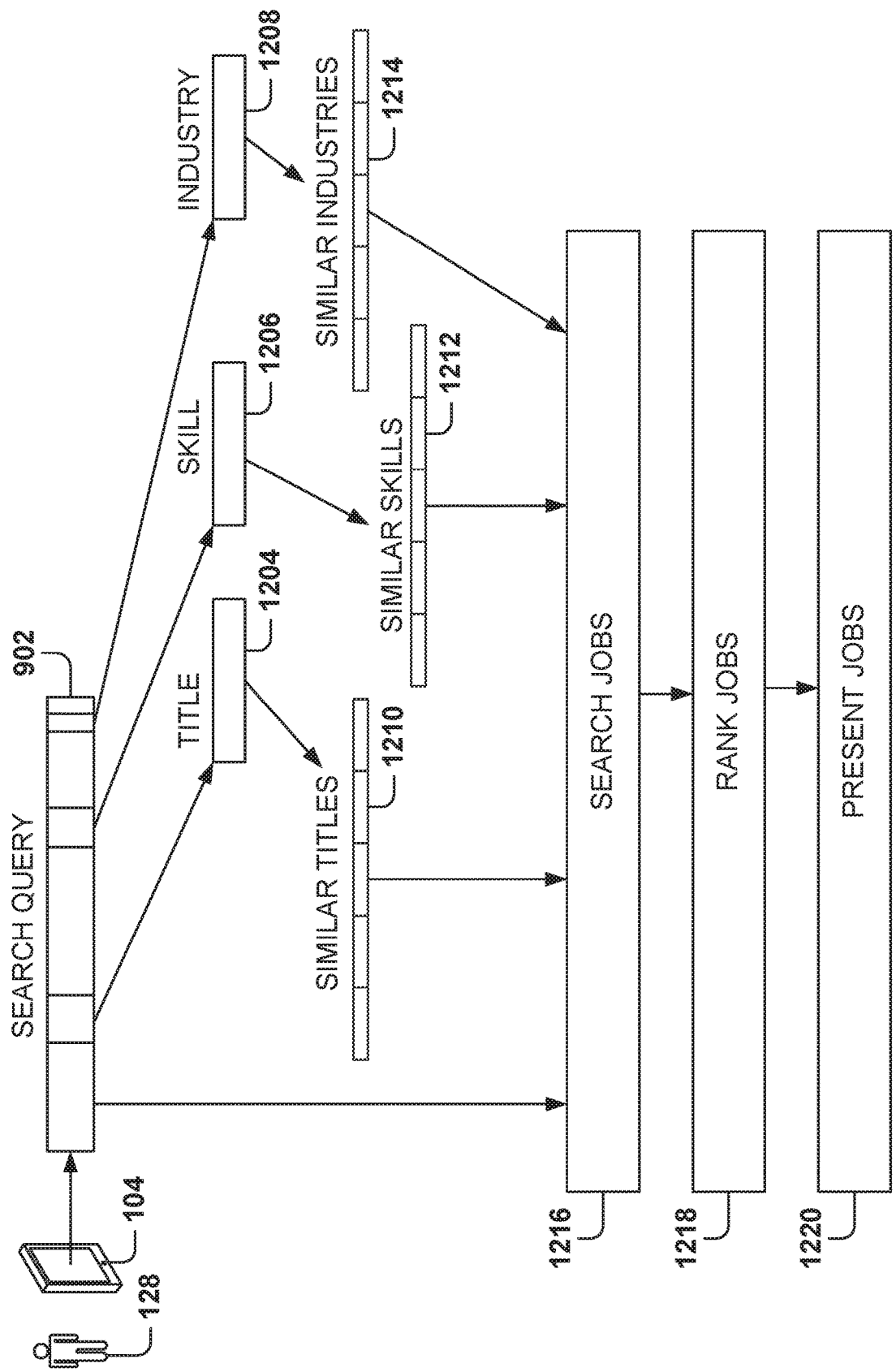
FIG. 12 illustrates a method for expanding a job search query with similar titles, skills, and industries, according to some example embodiments.

FIG. 12 illustrates a method for expanding a job search query with similar titles, skills, and industries, according to some example embodiments. As illustrated in FIGS. 9-11, a job search may be expanded by using similar industries, skills, or titles, respectively. In one example embodiment, the job search may be expanded by any combination of title 1204, skill 1206, and industry 1208, if present.

For example, if the tagger identifies the title 1204, the skill 1206, and the industry 1208 in the search query 902, then the search for jobs 1216 is based on the initial search query 902, in addition to the similar titles 1210, the similar skills 1212, and the similar industries 1214. If another search query 902 includes a title and a skill, then the correspondent job search will be enhanced by adding the correspondent similar titles and similar skills. After the search in operation, the jobs are ranked in operation 1218 and presented to the user in operation 1220.

Figure 13:
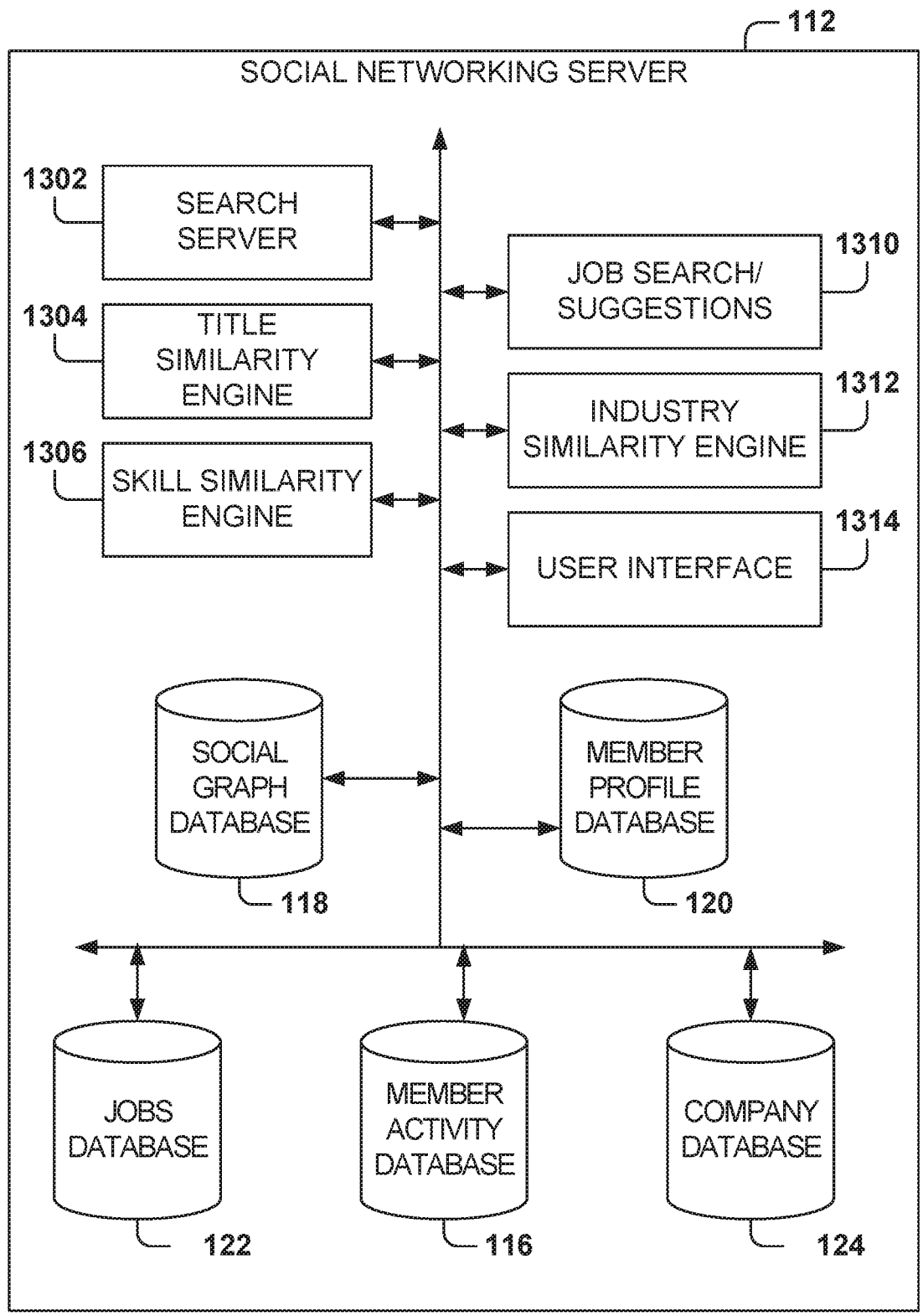
FIG. 13 illustrates a social networking server for implementing example embodiments.

FIG. 13 illustrates a social networking server for implementing example embodiments. In one example embodiment, the social networking server 112 includes a search server 1302, a title similarity engine 1304, a skill similarity engine 1306, a job search/suggestions server 1310, an industry similarity engine 1312, a user interface 1314, and a plurality of databases, which include the social graph database 118, the member profile database 120, the jobs database 122, the member activity database 116, and the company database 124.

The search server 1302 performs data searches on the social network, such as searches for members or companies. The job search/suggestions server 1310 performs job searches based on a search query or based on a member profile in order to offer job suggestions. In some example embodiments, the search server 1310 includes a machine-learning algorithm for performing the searches, which utilizes a plurality of features for selecting and scoring the jobs. The features include, at least, one or more of title, industry, skills, member profile, company profile, job title, job data, region, and salary range.

The title similarity engine 1304 analyzes data in order to find similarities among the different titles. For example, the title similarity engine 1304 performs the operations illustrated in FIGS. 6 and 7.

The skill similarity engine 1306 analyzes data in order to find similarities among the different skills. For example, the skill similarity engine 1306 performs the operations illustrated in FIG. 8.

The industry similarity engine 1312 analyzes data in order to find similarities among the different industries. For example, the industry similarity engine 1312 performs the operations illustrated in FIG. 9.

The user interface 1314 communicates with the client devices 128 to exchange user interface data for presenting the user interface 1314 to the user. It is noted that the embodiments illustrated in FIG. 13 are examples and do not describe every possible embodiment. Other embodiments may utilize different servers, additional servers, combine the functionality of two or more servers into a single server, utilize a distributed server pool, and so forth. The embodiments illustrated in FIG. 13 should therefore not be interpreted to be exclusive or limiting, but rather illustrative.

Figure 14:
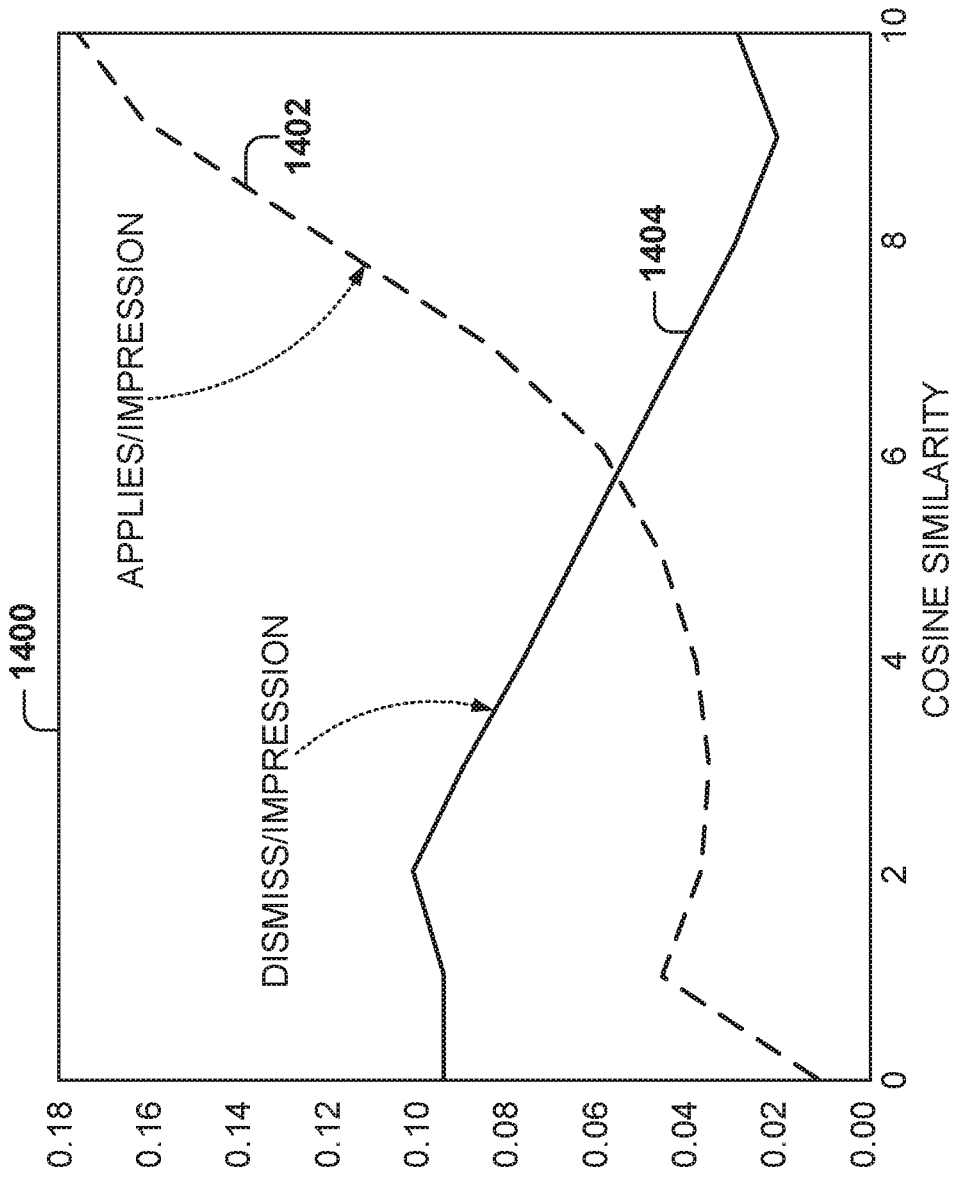
FIG. 14 is a diagram illustrating improved user interactions with the job search engine, according to some example embodiments.

FIG. 14 is a diagram illustrating improved user interactions with the job search engine, according to some example embodiments. In some example embodiments, job applications were tracked and it was observed that as the similarity (measured as cosine similarity) increases between member titles and job titles, the percentage of job applications 1402 increases.

In some example embodiments, users are given the option of dismissing job recommendations, e.g., "I don't like this job you propose." Again, job applications were tracked and it was observed that as the similarity (measured as cosine similarity) increases between member and job titles, the number of dismissed job 1404 decreases.

Figure 15:
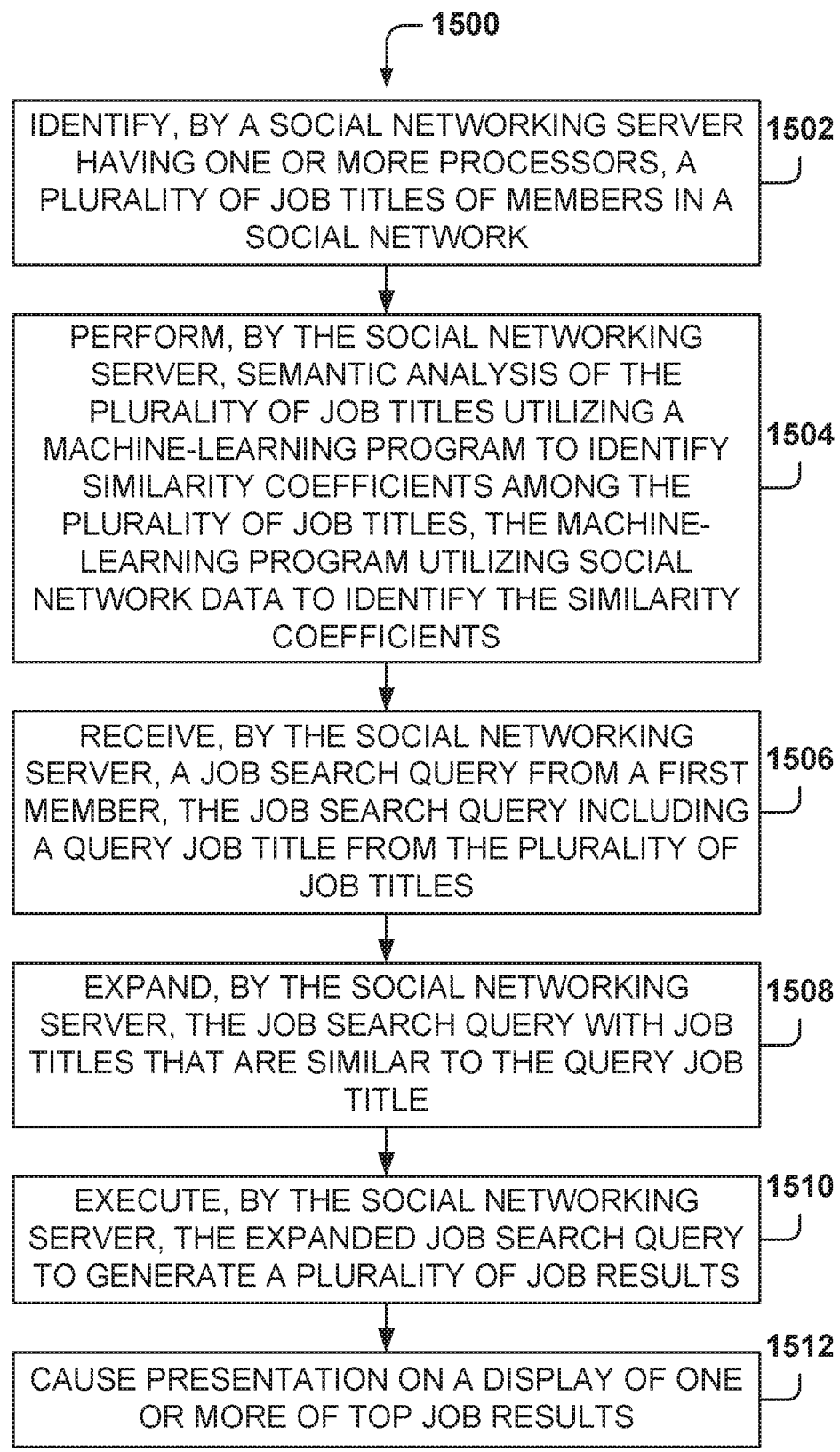
FIG. 15 is a flowchart of a method, according to some example embodiments, for expanding a job search by adding titles that are similar to a job title entered in the job search.

FIG. 15 is a flowchart of a method 1500, according to some example embodiments, for expanding a job search by adding titles that are similar to a job title entered in the job search. While the various operations in this flowchart are presented and described sequentially, one of ordinary skill will appreciate that some or all of the operations may be executed in a different order, be combined or omitted, or be executed in parallel.

At operation 1502, a social networking server having one or more processors, identifies a plurality of job titles of members in a social network. From operation 1502, the method flows to operation 1504 where the social networking server performs semantic analysis of the plurality of job titles utilizing a machine-learning program to identify similarity coefficients among the plurality of job titles, where the machine-learning program utilizes social network data to identify the similarity coefficients.

Further, from operation 1504, the method flows to operation 1506 for receiving, by the social networking server, a job search query from a first member, the job search query including a query job title from the plurality of job titles.

At operation 1508, the social networking server expands the job search query with job titles that are similar to the query job title, and at operation 1510, the social networking server executes the expanded job search query to generate a plurality of job results. From operation 1510, the method flows to operation 1512 for causing presentation on a display of one or more of top job results.

In one embodiment, expanding the job search query further includes determining job titles with a similarity coefficient to the query job title greater than a predetermined threshold.

In another embodiment, expanding the job search query further includes adding the determined job titles to the job search query to obtain the expanded job search query.

In one example, performing the semantic analysis further includes: identifying words in the plurality of titles; assigning a vector to each word; calculating a compressed vector for each word such that words with similar meanings have vectors near each other; and, for titles with multiple words, calculating a combination vector by aggregating the compressed vectors of the words in the title.

In another example, the social network data includes one or more of member profile data, member activity data in the social network, job application data, job posts data, and company data, or any combination thereof.

The similarity coefficient between a first job title and a second job title is a real number that quantifies a similarity between the first job title and the second job title.

In one embodiment, the method further comprises parsing, by the social networking server, the search query to identify a plurality of words, and detecting that one or more words from the plurality of words are associated with the query job title.

In one example, the expanded job search query is executed by a machine-learning algorithm trained with identified features that include the job title and the member job title.

In another example, the method further comprises scoring each job result from the plurality of job results after executing the expanded job search query and sorting the plurality of job results based on the scoring.

In another example, the method further comprises identifying job recommendations for a second member without receiving a job search query, the identifying job recommendations including: accessing profile data of the second member, the profile data including a second member job title; identifying job titles that are similar to the second member job title; executing, by the social networking server, a job search based on the profile data of the second member and the identified job titles that are similar to the second member job title; and causing presentation on a display of one or more of results from the job search.

Figure 16:
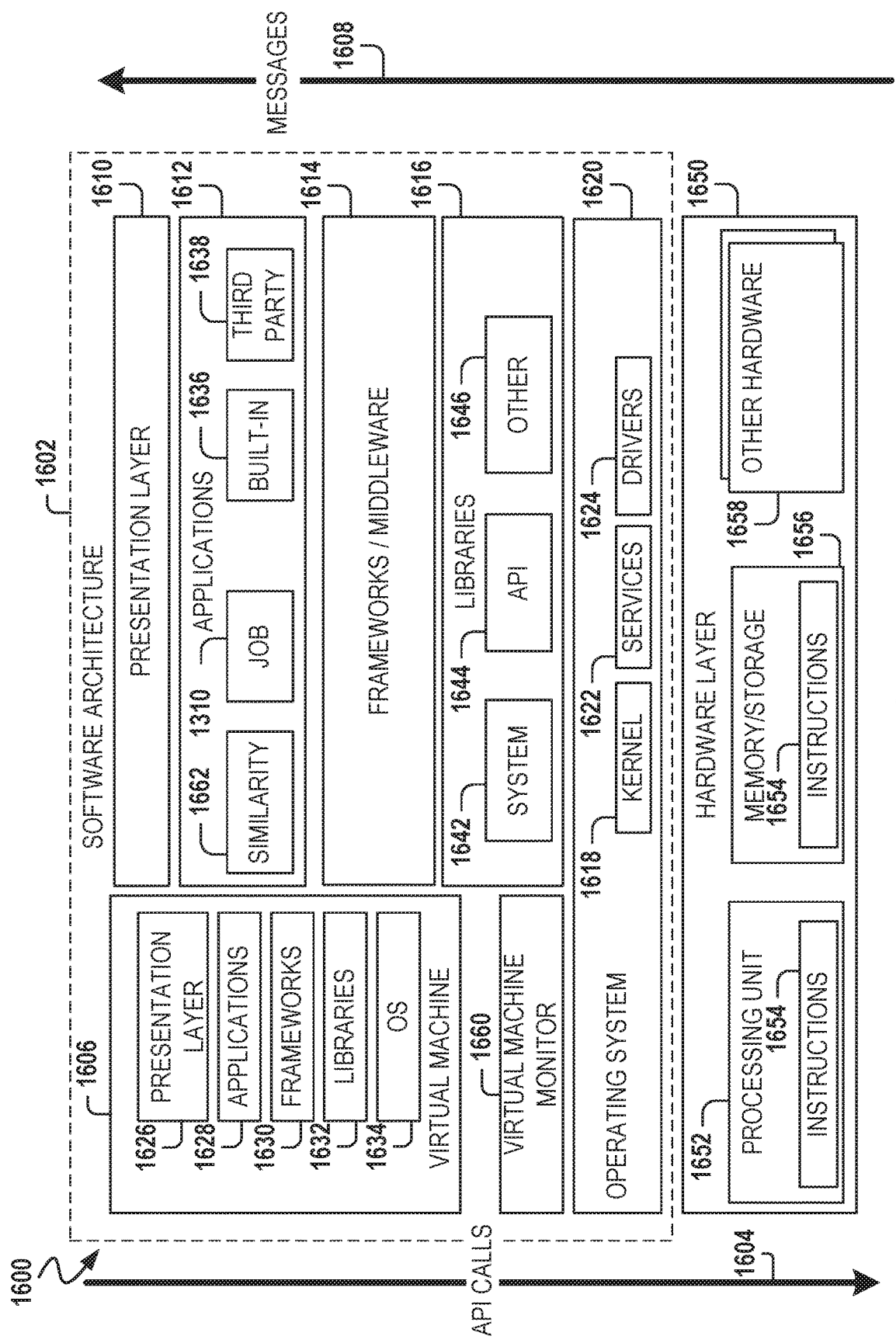
FIG. 16 is a block diagram illustrating an example of a software architecture that may be installed on a machine, according to some example embodiments.

FIG. 16 is a block diagram 1600 illustrating a representative software architecture 1602, which may be used in conjunction with various hardware architectures herein described. FIG. 16 is merely a non-limiting example of a software architecture 1602 and it will be appreciated that many other architectures may be implemented to facilitate the functionality described herein. The software architecture 1602 may be executing on hardware such as a machine 1700 of FIG. 17 that includes, among other things, processors 1704, memory/storage 1706, and input/output (I/O) components 1718. A representative hardware layer 1650 is illustrated and may represent, for example, the machine 1700 of FIG. 17. The representative hardware layer 1650 comprises one or more processing units 1652 having associated executable instructions 1654. The executable instructions 1654 represent the executable instructions of the software architecture 1602, including implementation of the methods, modules and so forth of FIGS. 1-15. The hardware layer 1650 also includes memory and/or storage modules 1656, which also have the executable instructions 1654. The hardware layer 1650 may also comprise other hardware 1658, which represents any other hardware of the hardware layer 1650, such as the other hardware illustrated as part of the machine 1700.

In the example architecture of FIG. 16, the software architecture 1602 may be conceptualized as a stack of layers where each layer provides particular functionality. For example, the software architecture 1602 may include layers such as an operating system 1620, libraries 1616, frameworks/middleware 1614, applications 1612, and a presentation layer 1610. Operationally, the applications 1612 and/or other components within the layers may invoke application programming interface (API) calls 1604 through the software stack and receive a response, returned values, and so forth illustrated as messages 1608 in response to the API calls 1604. The layers illustrated are representative in nature and not all software architectures have all layers. For example, some mobile or special purpose operating systems may not provide a frameworks/middleware layer 1614, while others may provide such a layer. Other software architectures may include additional or different layers.

The operating system 1620 may manage hardware resources and provide common services. The operating system 1620 may include, for example, a kernel 1618, services 1622, and drivers 1624. The kernel 1618 may act as an abstraction layer between the hardware and the other software layers. For example, the kernel 1618 may be responsible for memory management, processor management (e.g., scheduling), component management, networking, security settings, and so on. The services 1622 may provide other common services for the other software layers. The drivers 1624 may be responsible for controlling or interfacing with the underlying hardware. For instance, the drivers 1624 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1616 may provide a common infrastructure that may be utilized by the applications 1612 and/or other components and/or layers. The libraries 1616 typically provide functionality that allows other software modules to perform tasks in an easier fashion than to interface directly with the underlying operating system 1620 functionality (e.g., kernel 1618, services 1622, and/or drivers 1624). The libraries 1616 may include system libraries 1642 (e.g., C standard library) that may provide functions such as memory allocation functions, string manipulation functions, mathematic functions, and the like. In addition, the libraries 1616 may include API libraries 1644 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 1616 may also include a wide variety of other libraries 1646 to provide many other APIs to the applications 1612 and other software components/modules.

The frameworks 1614 (also sometimes referred to as middleware) may provide a higher-level common infrastructure that may be utilized by the applications 1612 and/or other software components/modules. For example, the frameworks 1614 may provide various graphic user interface (GUI) functions, high-level resource management, high-level location services, and so forth. The frameworks 1614 may provide a broad spectrum of other APIs that may be utilized by the applications 1612 and/or other software components/modules, some of which may be specific to a particular operating system or platform.

The applications 1612 include similarity applications 1662, job search/suggestions 1310, built-in applications 1636, and third-party applications 1638. The similarity applications 1662 comprise the title similarity engine 1304, the skill similarity engine 1306, and the industry similarity engine 1312, as discussed above with reference to FIG. 13. Examples of representative built-in applications 1636 may include, but are not limited to, a contacts application, a browser application, a book reader application, a location application, a media application, a messaging application, and/or a game application. The third-party applications 1638 may include any of the built-in applications 1636 as well as a broad assortment of other applications. In a specific example, the third-party application 1638 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1638 may invoke the API calls 1604 provided by the mobile operating system such as the operating system 1620 to facilitate functionality described herein.

The applications 1612 may utilize built-in operating system functions (e.g., kernel 1618, services 1622, and/or drivers 1624), libraries (e.g., system libraries 1642, API libraries 1644, and other libraries 1646), or frameworks/middleware 1614 to create user interfaces to interact with users of the system. Alternatively, or additionally, in some systems, interactions with a user may occur through a presentation layer, such as the presentation layer 1610. In these systems, the application/module "logic" may be separated from the aspects of the application/module that interact with a user.

Some software architectures utilize virtual machines. In the example of FIG. 16, this is illustrated by a virtual machine 1606. A virtual machine creates a software environment where applications/modules may execute as if they were executing on a hardware machine (such as the machine 1700 of FIG. 17, for example). The virtual machine 1606 is hosted by a host operating system (e.g., operating system 1620 in FIG. 16) and typically, although not always, has a virtual machine monitor 1660, which manages the operation of the virtual machine 1606 as well as the interface with the host operating system (e.g., operating system 1620). A software architecture executes within the virtual machine 1606 such as an operating system 1634, libraries 1632, frameworks/middleware 1630, applications 1628, and/or a presentation layer 1626. These layers of software architecture executing within the virtual machine 1606 may be the same as corresponding layers previously described or may be different.

Figure 17:
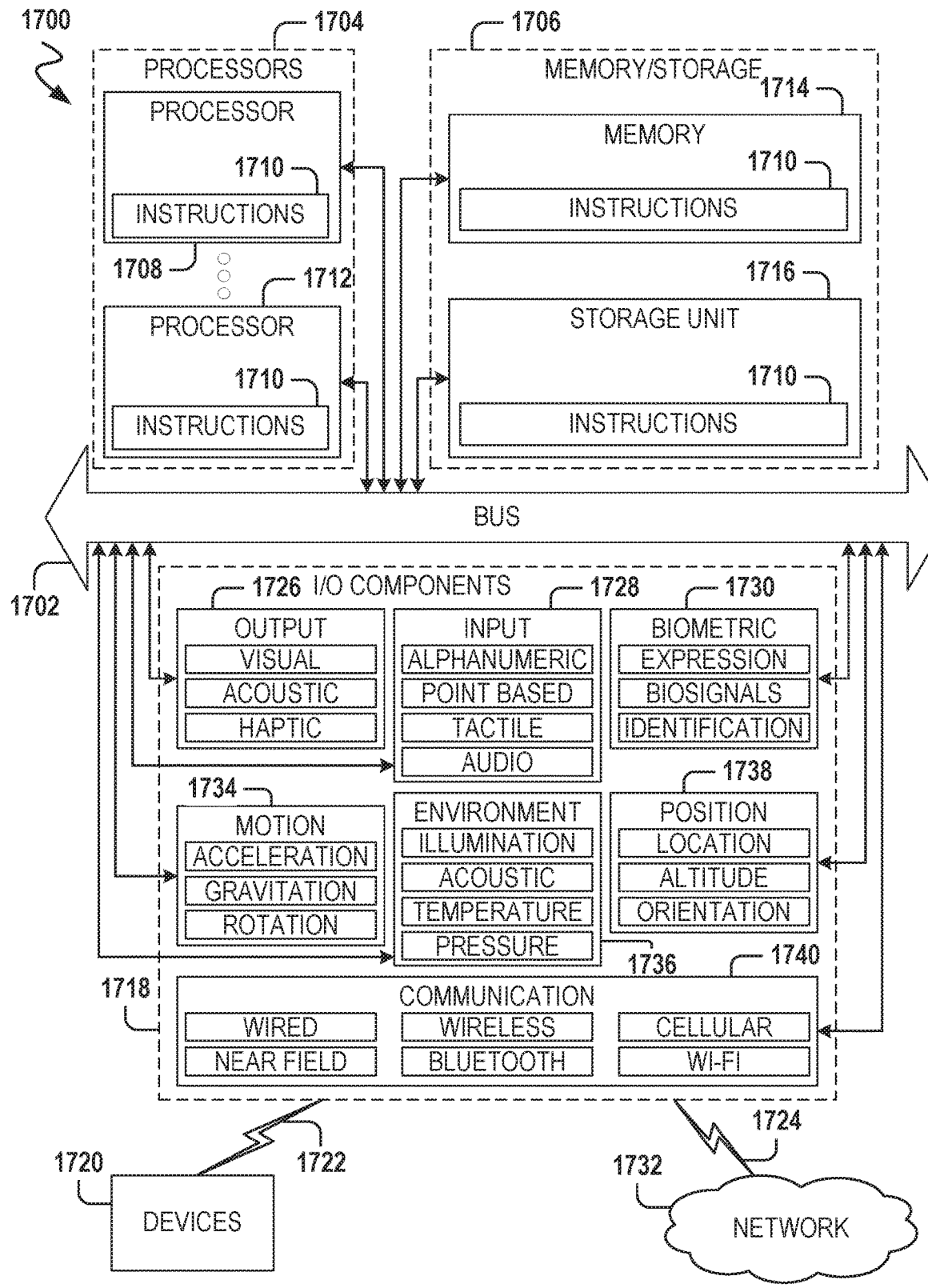
FIG. 17 illustrates a diagrammatic representation of a machine in the form of a computer system within which a set of instructions may be executed for causing the machine to perform any one or more of the methodologies discussed herein, according to an example embodiment.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1710 (e.g., software, a program, an application, an applet, an app, or other executable code) for causing the machine 1700 to perform any one or more of the methodologies discussed herein may be executed. For example, the instructions 1710 may cause the machine 1700 to execute the flow diagrams of FIGS. 6-12 and 15. Additionally, or alternatively, the instructions 1710 may implement the programs of social networking server 112, including the search server 1302, the title similarity engine 1304, the skill similarity engine 1306, the job search/suggestions 1310, the industry similarity engine 1312, and the user interface 1314 of FIG. 13, and so forth. The instructions 1710 transform the general, non-programmed machine 1700 into a particular machine 1700 programmed to carry out the described and illustrated functions in the manner described.

In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1710, sequentially or otherwise, that specify actions to be taken by the machine 1700. Further, while only a single machine 1700 is illustrated, the term "machine" shall also be taken to include a collection of machines 1700 that individually or jointly execute the instructions 1710 to perform any one or more of the methodologies discussed herein.

The machine 1700 may include processors 1704, memory/storage 1706, and I/O components 1718, which may be configured to communicate with each other such as via a bus 1702. In an example embodiment, the processors 1704 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1708 and a processor 1712 that may execute the instructions 1710. The term "processor" is intended to include multi-core processors that may comprise two or more independent processors (sometimes referred to as "cores") that may execute instructions contemporaneously. Although FIG. 17 shows multiple processors 1704, the machine 1700 may include a single processor with a single core, a single processor with multiple cores (e.g., a multi-core processor), multiple processors with a single core, multiple processors with multiples cores, or any combination thereof.

The memory/storage 1706 may include a memory 1714, such as a main memory, or other memory storage, and a storage unit 1716, both accessible to the processors 1704 such as via the bus 1702. The storage unit 1716 and memory 1714 store the instructions 1710 embodying any one or more of the methodologies or functions described herein. The instructions 1710 may also reside, completely or partially, within the memory 1714, within the storage unit 1716, within at least one of the processors 1704 (e.g., within the processor's cache memory), or any suitable combination thereof, during execution thereof by the machine 1700. Accordingly, the memory 1714, the storage unit 1716, and the memory of the processors 1704 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1710. The term "machine-readable medium" shall also be taken to include any medium, or combination of multiple media, that is capable of storing instructions (e.g., instructions 1710) for execution by a machine (e.g., machine 1700), such that the instructions, when executed by one or more processors of the machine (e.g., processors 1704), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1718 may include a wide variety of components to receive input, provide output, produce output, transmit information, exchange information, capture measurements, and so on. The specific I/O components 1718 that are included in a particular machine will depend on the type of machine. For example, portable machines such as mobile phones will likely include a touch input device or other such input mechanisms, while a headless server machine will likely not include such a touch input device. It will be appreciated that the I/O components 1718 may include many other components that are not shown in FIG. 17. The I/O components 1718 are grouped according to functionality merely for simplifying the following discussion, and the grouping is in no way limiting. In various example embodiments, the I/O components 1718 may include output components 1726 and input components 1728. The output components 1726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1718 may include biometric components 1730, motion components 1734, environmental components 1736, or position components 1738 among a wide array of other components. For example, the biometric components 1730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1734 may include acceleration sensor components (e.g., accelerometer), gravitation sensor components, rotation sensor components (e.g., gyroscope), and so forth. The environmental components 1736 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1718 may include communication components 1740 operable to couple the machine 1700 to a network 1732 or devices 1720 via a coupling 1724 and a coupling 1722, respectively. For example, the communication components 1740 may include a network interface component or other suitable device to interface with the network 1732. In further examples, the communication components 1740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1720 may be another machine or any of a wide variety of peripheral devices (e.g., a peripheral device coupled via a USB).

Moreover, the communication components 1740 may detect identifiers or include components operable to detect identifiers. For example, the communication components 1740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1740, such as location via Internet Protocol (IP) geo-location, location via Wi-Fi® signal triangulation, location via detecting an NFC beacon signal that may indicate a particular location, and so forth.

In various example embodiments, one or more portions of the network 1732 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1732 or a portion of the network 1732 may include a wireless or cellular network and the coupling 1724 may be a Code Division Multiple Access (CDMA) connection, a Global System for Mobile communications (GSM) connection, or another type of cellular or wireless coupling. In this example, the coupling 1724 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1710 may be transmitted or received over the network 1732 using a transmission medium via a network interface device (e.g., a network interface component included in the communication components 1740) and utilizing any one of a number of well-known transfer protocols (e.g., hypertext transfer protocol (HTTP)). Similarly, the instructions 1710 may be transmitted or received using a transmission medium via the coupling 1722 (e.g., a peer-to-peer coupling) to the devices 1720. The term "transmission medium" shall be taken to include any intangible medium that is capable of storing, encoding, or carrying the instructions 1710 for execution by the machine 1700, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    identifying, by a social networking server having one or more processors, job titles of members in a social networking service;
    performing, by the social networking server, semantic analysis of the job titles of members of the social networking service utilizing a machine-learning program to identify similarity coefficients among the job titles, the machine-learning program utilizing a machine-learned model that has been trained with training data that includes job titles from job postings to which members have submitted job applications, and the job titles of the members who have submitted the job applications to the job postings, to identify the similarity coefficients;

receiving, by the social networking server, a job search query from a first member;

parsing, by the social networking server, the job search query to identify a plurality of words;

detecting that one or more words from the plurality of words are associated with a query job title;

identifying job titles, of members of the social networking service, that are similar to the query job title based on the similarity coefficients that have been identified via the machine-learning program;

expanding, by the social networking server, the job search query by adding to the job search query the job titles that are similar to the query job title;

executing, by the social networking server, the expanded job search query to generate a plurality of job results; and causing presentation on a display of one or more job results.

2. The method as recited in claim 1, wherein identifying job titles that are similar to the query job title further comprises:

identifying job titles having a similarity coefficient to the query job title greater than a predetermined threshold.

3. The method as recited in claim 1, wherein performing the semantic analysis further comprises:

identifying words in the job titles of members in the social networking service;

assigning a vector to each word;

calculating a compressed vector for each word such that words with similar meanings have vectors near each other; and for job titles with multiple words, calculating a combination vector by aggregating the compressed vectors of the words in the job title.

4. The method as recited in claim 1, wherein the similarity coefficient between a first job title and a second job title is a real number that quantifies a measure of similarity between the first job title and the second job title.

5. The method as recited in claim 1, further comprising:

scoring each job result from the plurality of job results after executing the expanded job search query; and sorting the plurality of job results based on the scoring.

6. The method as recited in claim 1, further comprising:

identifying job recommendations for a second member without receiving a job search query, the method further comprising:

accessing profile data of the second member, the profile data including a second member job title;

identifying job titles that are similar to the second member job title;

executing, by the social networking server, a job search based on the profile data of the second member and the identified job titles that are similar to the second member job title; and causing presentation on a display of one or more of results from the job search.

7. A social networking server comprising:

a memory with instructions;

a member database storing member information that comprises a member job title from a plurality of job titles;

a database storing social networking data; and one or more computer processors, wherein the instructions, when executed by the one or more computer processors, cause the one or more computer processors to perform operations comprising:

performing semantic analysis of the job titles of members of a social networking service utilizing a machine-learning program to identify similarity coefficients among the job titles, the machine-learning program utilizing a machine-learned model that has been trained with training data that includes job titles from job postings to which members have submitted job applications, and the job titles of members to identify the similarity coefficients;

receiving a job search query from a first member;

parsing, by the social networking server, the search query to identify a plurality of words;

detecting that one or more words from the plurality of words are associated with a query job title;

identifying job titles, of members of the social networking service, that are similar to the query job title based on the similarity coefficients that have been identified via the machine-learning program;

expanding the job search query by adding to the job search query the job titles that are similar to the query job title;

executing the expanded job search query to generate a plurality of job results; and causing presentation on a display of one or more job results.

8. The social networking server as recited in claim 7, wherein identifying job titles that are similar to the query job title further comprises:

identifying job titles having a similarity coefficient to the query job title greater than a predetermined threshold.

9. The social networking server as recited in claim 7, wherein performing the semantic analysis further comprises:

identifying words in the job titles of members in the social networking service;

assigning a vector to each word;

calculating a compressed vector for each word such that words with similar meanings have vectors near each other; and for job titles with multiple words, calculating a combination vector by aggregating the compressed vectors of the words in the job title.

10. The social networking server as recited in claim 7, wherein the instructions further cause the one or more computer processors to perform operations comprising:

identifying job recommendations for a second member without receiving a job search query, by:

accessing profile data of the second member, the profile data including a second member job title;

identifying job titles that are similar to the second member job title;

executing, by the social networking server, a job search based on the profile data of the second member and the identified job titles that are similar to the second member job title; and causing presentation on a display of one or more of results from the job search.

11. A non-transitory machine-readable storage medium including instructions that, when executed by a machine, cause the machine to perform operations comprising:

identifying, by a social networking server having one or more processors, job titles of members of a social networking service;

performing, by the social networking server, semantic analysis of the job titles of members of the social networking service utilizing a machine-learning program to identify similarity coefficients among the job titles, the machine-learning program utilizing a machine-learned model that has been trained with training data that includes job titles from job postings to which members have submitted job applications, and the job titles of the members who have submitted the job applications to the job postings to identify the similarity coefficients;

receiving, by the social networking server, a job search query from a first member;

parsing, by the social networking server, the search query to identify a plurality of words;

detecting that one or more words from the plurality of words are associated with the query job title;

identifying job titles, of members of the social networking service, that are similar to the query job title based on the similarity coefficients that have been identified via the machine-learning program;

expanding, by the social networking server, the job search query by adding to the job search query the job titles that are similar to the query job title;

executing, by the social networking server, the expanded job search query to generate a plurality of job results; and causing presentation on a display of one or more job results.

12. The machine-readable storage medium as recited in claim 11, wherein the machine further performs operations comprising identifying job recommendations for a second member without receiving a job search query, by:

accessing profile data of the second member, the profile data including a second member job title;

identifying job titles that are similar to the second member job title;

executing, by the social networking server, a job search based on the profile data of the second member and the identified job titles that are similar to the second member job title; and causing presentation on a display of one or more of results from the job search.

13. The machine-readable storage medium as recited in claim 11, wherein identifying job titles that are similar to the query job title further comprises:

identifying job titles, of the members of the social networking service, with a similarity coefficient to the query job title greater than a predetermined threshold.

14. The machine-readable storage medium as recited in claim 11, wherein performing the semantic analysis further comprises:

identifying words in the job titles of members in the social networking service;

assigning a vector to each word;

calculating a compressed vector for each word such that words with similar meanings have vectors near each other; and for job titles with multiple words, calculating a combination vector by aggregating the compressed vectors of the words in the job title.

15. The machine-readable storage medium as recited in claim 11, wherein the machine further performs operations comprising:

scoring each job result from the plurality of job results after executing the expanded job search query; and sorting the plurality of job results based on the scoring.

* * * * *